United States Patent
Ariyama

(10) Patent No.: US 8,018,811 B2
(45) Date of Patent: Sep. 13, 2011

(54) DECODE DEVICE, REPRODUCTION APPARATUS, AND METHOD FOR DECODING

(75) Inventor: Takeo Ariyama, Kawasaki (JP)

(73) Assignee: Renesas Electronics Corporation, Kanagawa (JP)

(*) Notice: Subject to any disclaimer, the term of this patent is extended or adjusted under 35 U.S.C. 154(b) by 441 days.

(21) Appl. No.: 12/251,764

(22) Filed: Oct. 15, 2008

(65) Prior Publication Data

US 2009/0103411 A1  Apr. 23, 2009

(30) Foreign Application Priority Data

Oct. 17, 2007  (JP) ................ 2007-270626

(51) Int. Cl.
*G11B 20/10* (2006.01)

(52) U.S. Cl. ............ 369/59.23; 369/47.19; 369/59.17; 369/124.04

(58) Field of Classification Search .......... 369/59.17, 369/59.19, 59.21, 59.23–59.25, 47.19, 47.27, 369/47.28, 124.04–124.08, 124.15
See application file for complete search history.

(56) References Cited

U.S. PATENT DOCUMENTS

| | | | |
|---|---|---|---|
| 6,034,934 A * | 3/2000 | Miyake et al. ............. | 369/53.28 |
| 6,909,679 B2 * | 6/2005 | Chou et al. ................. | 369/53.35 |
| 7,414,943 B2 * | 8/2008 | MacDonald et al. ...... | 369/59.25 |
| 7,496,009 B2 * | 2/2009 | Chen ......................... | 369/47.19 |
| 2004/0066723 A1 * | 4/2004 | Hou et al. .................. | 369/53.34 |
| 2005/0286369 A1 * | 12/2005 | Yen et al. ................... | 369/59.19 |
| 2006/0077805 A1 * | 4/2006 | Suzuki ....................... | 369/44.27 |
| 2006/0092798 A1 * | 5/2006 | Lee et al. ................... | 369/53.2 |
| 2006/0181998 A1 * | 8/2006 | Chen et al. ................. | 369/47.48 |
| 2007/0025211 A1 * | 2/2007 | Navon et al. ............... | 369/52.1 |
| 2008/0130438 A1 * | 6/2008 | Mihara et al. ............. | 369/47.36 |

FOREIGN PATENT DOCUMENTS

JP  2004-047056 A  2/2004

* cited by examiner

*Primary Examiner* — Thang Tran
(74) *Attorney, Agent, or Firm* — Sughrue Mion, PLLC

(57) ABSTRACT

A decoding apparatus includes a burst cutting area (BCA) signal interval measuring device which measures a signal interval of a BCA area and which outputs BCA signal interval information, a T converter which obtains T information from the BCA signal interval information, a sequencer which detects a space area based on a first threshold value and which outputs an output enable signal based on the T information and a detecting result, wherein the output enable signal shows that a signal is obtained from a data area of the BCA area, and the space area is a non-signal area of the BCA area, and a channel data converter which converts the T information into channel data based on the output enable signal from the sequencer.

19 Claims, 22 Drawing Sheets

| 1BYTE | 4BYTE | | | | | |
|---|---|---|---|---|---|---|
| SB3,3 | BCApre-amble(all 00h) | | | | 1ROW | |
| SB0,0 | I0,0 | I0,1 | I0,2 | I0,3 | 4ROWS DATA | |
| SB0,0 | I4,1 | I5,0 | I6,0 | I7,0 | | |
| SB0,0 | I8,0 | I9,0 | I10,0 | I11,0 | | |
| SB0,0 | I12,0 | I13,0 | I14,0 | I15,0 | | 1DATA UNIT |
| SB0,1 | C0,0 | C0,1 | C0,2 | C0,3 | 4ROWS PARITY | |
| SB0,1 | C4,0 | C5,0 | C6,0 | C7,0 | | |
| SB0,1 | C8,0 | C9,0 | C10,0 | C11,0 | | |
| SB0,1 | C12,0 | C13,0 | C14,0 | C15,0 | | |
| SB0,2 | I0,1 | I1,1 | I2,1 | I3,1 | 4ROWS DATA | |
| SB0,2 | I4,1 | I5,1 | I6,1 | I7,1 | | |
| SB0,2 | I8,1 | I9,1 | I10,1 | I11,1 | | |
| SB0,2 | I12,1 | I13,1 | I14,1 | I15,1 | | 1DATA UNIT |
| SB0,3 | C0,1 | C1,1 | C2,1 | C3,1 | 4ROWS PARITY | |
| SB0,3 | C4,1 | C5,1 | C6,1 | C7,1 | | |
| SB0,3 | C8,1 | C9,1 | C10,1 | C11,1 | | |
| SB0,3 | C12,1 | C13,1 | C14,1 | C15,1 | | |
| SB1,0 | I0,2 | I1,2 | I2,2 | I3,2 | 4ROWS DATA | |
| SB1,0 | I4,2 | I5,2 | I6,2 | I7,2 | | |
| SB1,0 | I8,2 | I9,2 | I10,2 | I11,2 | | |
| SB1,0 | I12,2 | I13,2 | I14,2 | I15,2 | | 1DATA UNIT |
| SB1,1 | C0,2 | C1,2 | C2,2 | C3,2 | 4ROWS PARITY | |
| SB1,1 | C4,2 | C5,2 | C6,2 | C7,2 | | |
| SB1,1 | C8,2 | C9,2 | C10,2 | C11,2 | | |
| SB1,1 | C12,2 | C13,2 | C14,2 | C15,2 | | |
| SB1,2 | I0,3 | I1,3 | I2,3 | I3,3 | 4ROWS DATA | |
| SB1,2 | I4,3 | I5,3 | I6,3 | I7,3 | | |
| SB1,2 | I8,3 | I9,3 | I10,3 | I11,3 | | |
| SB1,2 | I12,3 | I13,3 | I14,3 | I15,3 | | 1DATA UNIT |
| SB1,3 | C0,3 | C1,3 | C2,3 | C3,3 | 4ROWS PARITY | |
| SB1,3 | C4,3 | C5,3 | C6,3 | C7,3 | | |
| SB1,3 | C8,3 | C9,3 | C10,3 | C11,3 | | |
| SB1,3 | C12,3 | C13,3 | C14,3 | C15,3 | | |
| SB3,2 | | | | | | |

Fig. 14

| BCA DATA BIT | MODULATED CHANNELBITS | |
|---|---|---|
| | SYNC PART | DATA PART |
| 00 | 010 | 1000 |
| 01 | 010 | 0100 |
| 10 | 010 | 0010 |
| 11 | 010 | 0001 |

Fig. 15

| SYNCBYNUMBER | MODULATION CHANNELBITS | | |
|---|---|---|---|
| | SYNCBODY | SYNC IDa | b |
| SB0, 0 | 01000010010100 | 0101 000 | 010 1000 |
| SB0, 1 | 01000010010100 | 0101 000 | 010 0100 |
| SB0, 2 | 01000010010100 | 0101 000 | 010 0010 |
| SB0, 3 | 01000010010100 | 0101 000 | 010 1000 |
| SB1, 0 | 01000010010100 | 101 0000 | 010 0010 |
| SB1, 1 | 01000010010100 | 101 0000 | 010 1000 |
| SB1, 2 | 01000010010100 | 101 0000 | 010 0010 |
| SB1, 3 | 01000010010100 | 101 0000 | 010 0001 |
| SB3, 3 | 01000010010100 | 010 0001 | 010 0001 |
| SB3, 2 | 01000010010100 | 010 0001 | 010 0010 |

Fig. 16

DECODE DEVICE, REPRODUCTION APPARATUS, AND METHOD FOR DECODING

BACKGROUND

1. Field of the Invention

The present invention relates to a decode device of a disk including a BCA (burst cutting area) area, a reproduction apparatus including the decode device, and a method for decoding.

2. Description of Related Art

FIG. 20 is a schematic diagram showing a BCA signal area on a disk. FIG. 21 is a diagram showing a format of data stored in a BCA of a DVD. As shown in FIG. 20, the BCA signal area is included in an inner peripheral side of the disk in a media such as DVD, HD DVD, and Blu-ray. Data is recorded in a radial direction in the BCA area by a barcode-like pattern having low reflectance formed by an intense laser in a manufacturing process. The time corresponding to 1T is determined by a standard for the interval between the lines having low reflectance in a certain number of rotations of a certain radius, and the interval width is regarded as the data.

It is needed to detect the head of the BCA signal area in order to obtain BCA information data. According to a related art, patterns of a synchronization pattern $SB_{BCA}$ shown in FIG. 21 are compared and detected to identify the head position of the information data. However, when the matching of the synchronization pattern is not detected due to the influence of a noise or the like, it is difficult to obtain the BCA information data.

In Japanese Unexamined Patent Application Publication No. 2004-47056 (Noro), two among $SB_{BCA}$, Preamble, and $RS_{BCA1}$ before the information data are detected to improve the accuracy of detecting the head position. FIG. 22 is a diagram showing a DVD reproduction apparatus disclosed by Noro.

As shown in FIG. 22, a decode device 100 includes a BCA decoding circuit 110, a buffering circuit 120, a buffering counter 125, and a BCA synchronization pattern detection circuit 130. The BCA decoding circuit 110 modulates and demodulates channel bits. The buffering circuit 120 buffers the channel bits. The buffering counter 125 monitors the buffering state of the buffering circuit. The BCA synchronization pattern detection circuit 130 detects the data having a predetermined value and detects data positional information of the channel data which is input.

The BCA synchronization pattern detection circuit 130 includes a ROM 131, a register 132, a comparison circuit 133, and a determination circuit 134. The ROM 131 stores a preamble data comparison pattern 131a and an ECC synch comparison pattern 131b. The register 132 is formed by a shift register for temporarily storing the channel bits. The comparison circuit 133 compares the channel bits with the comparing pattern. The determination circuit 134 detects the head of the BCA data based on the comparing result. The comparison circuit 133 includes a start synch comparison circuit 133a and an ECC synch comparison circuit 133b. The determination circuit 134 includes a start synch determination circuit 134a and an ECC area determination circuit 134b.

Further, the DVD reproduction apparatus disclosed in Noro includes the decode device, an optical disk 201, a spindle motor 202 controlling the rotation, an optical head 203 radiating a laser beam, a pickup 204 receiving the reflection of the laser beam, a binary circuit 205 binarizing the reflected beam, a synchronous dynamic random access memory (SDRAM) 210 storing the output data of the decode device 100, and a central processing unit (CPU) 220 generally controlling the circuit in the reproduction apparatus.

The spindle motor 202 controls the rotation of the optical disk 201. The optical head 203 radiates a laser beam to the optical disk 201, and the reflection of the laser beam is received by the pickup 204. This received reflection is binarized by the binary circuit 205 and is subjected to a demodulation process corresponding to RZ modulation to generate channel data. This channel data is input to the decode device 100.

The decode device 100 is a circuit decoding the reproduced data read out from the BCA of the DVD to extract the synchronization information of the BCA data (identification data) recorded in the BCA. This output data is stored in the synchronous dynamic random access memory (SDRAM) 210. Note that the circuit such as the decode device 100 in the reproduction apparatus is generally controlled by the CPU 220.

The BCA decoding circuit 110 demodulates the phase-modulated channel data and performs decoding including error detection using the EDC in the demodulated data and syndrome calculation related with the error correction of the ECC. The central processing unit 220 performs the error correction of the ECC based on the result of the syndrome calculation.

On the other hand, the buffering circuit 120 buffers the input data when instructed to start buffering and outputs the buffered data to the SDRAM 210 every time the buffered data reaches a predetermined data amount (four bytes, for example). Note that the buffering counter 125 monitors the buffering state of the buffering circuit 120. The BCA synchronization pattern detection circuit 130 detects the data having the predetermined value and detects the data positional information of the input channel data.

The BCA synchronization pattern detection circuit 130 detects the data having the predetermined value of the data shown in FIG. 21 and detects the data positional information of the input channel data. To be more specific, the BCA synchronization pattern detection circuit 130 detects the synchronization pattern and the preamble data. Then the BCA synchronization pattern detection circuit 130 detects the six bytes of data ($SB_{BCA}$, BCA Preamble, and $RS_{BCA1}$) added in front of the information data shown in FIG. 21 and outputs a start trigger signal instructing the start of buffering with the buffering circuit 120. Further, a boundary between a fourth synchronization pattern (re-synch: $RS_{BCA14}$) and a parity of the ECC shown in FIG. 21 is detected to output a stop trigger signal instructing the termination of buffering with the buffering circuit 120.

When a part of the data recorded in the BCA is missing or the noise is included in the reproduced data, the data may not be recognized as the synchronization pattern or the preamble data even when the synchronization pattern or the preamble data are input. In this case, it may be possible that the buffering cannot be started or the buffering is started at an abnormal timing. In order to prevent these problems, Noro discloses a technique of detecting the head of the BCA data (identification data) when the reproduced data matches at least two data of the reference patterns of a first synchronization pattern ($SB_{BCA}$), preamble data (BCA Preamble), and a second synchronization pattern ($RS_{BCA1}$).

Referring now to FIG. 23, a detection start procedure of the synchronization pattern disclosed in Noro will be described. As will be seen from FIG. 21, the data recorded in the BCA has one byte of the synchronization pattern added to the head of every four bytes of the information data. In the modulation processing that is executed to convert the information data into the recorded data (channel data), one bit is modulated to two bits. Since the recorded data is treated here, the data width of the standard in FIG. 21 is treated as doubled when the synchronization patterns are compared. For instance, one byte of synchronization pattern is treated as two bytes.

<1> Step SP101

A BCA binary signal (channel data) input to the buffering circuit 120 is input to the register 132.

<2> Step SP102

The channel data stored in the register 132 and the preamble data comparison pattern 131a are compared in the start comparison circuit 133a. In other words, the two bytes of the data at the head of the channel data stored in the register 132 is compared with the first synchronization pattern, and the eight bytes of data from the third byte to the tenth byte at the head of the channel data stored in the register 132 are compared with the data of the BCA preamble. Further, two bytes of data, the eleventh byte and the twelfth byte from the head of the channel data, stored in the register 132 are compared with the second synchronization pattern. The comparison here is performed until the channel data stored in the register 132 is matched with the preamble data comparison pattern 131a within the above margin of error.

<3> Step SP103

When any two or more of the first synchronization pattern, the BCA Preamble, and the second synchronization pattern match as a result of comparison at SP102, the data is regarded as the preamble data, and the process goes to <5>. When they do not match, the process goes to <4>.

<4> Step SP104

The register 132 is sequentially shifted by one bit unit, and the process goes to <1>.

<5> Step SP105

The start trigger signal is output from the start synch determination circuit 134a to the buffering circuit 120 or the BCA decoding circuit 110.

Referring now to FIG. 24, the completion of the detection of the synchronization pattern disclosed by Noro will be described. Since the recorded data is treated here as well, the data width of the standard in FIG. 21 is treated doubled when the synchronization patterns are compared.

<1> Step SP201

The BCA binary signal (channel data) input to the BCA decoding circuit 110 is input to the register 132.

<2> Step SP202

It is determined whether ten bytes of data are stored in the register 132. When the ten bytes of data are stored, the process goes to <3>. When the ten bytes of data are not stored, the process goes to <9>.

<3> Step SP203

The value +4 (corresponding to the information data after demodulation) is added to the buffering counter.

<4> Step SP204

The first two bytes of the data stored in the register 132 are compared with the ECC synch comparison pattern 131b. The comparison here is performed until the channel data stored in the register 132 is matched with the preamble data comparison pattern 131a within the above margin of error.

<5> Step SP205

When the comparing result indicates matching as a result of <4>, the step goes to <6>. When the result does not indicate matching, the step goes to <9>.

<6> Step SP206

The value +1 is added (incremented) to the ECC synch detection counter 136.

<7> Step SP207

When the buffering counter 125 is a multiple of 16, then the process goes to <8>. When the buffering counter 125 is not the multiple of 16, the process goes to <9>. The multiple of 16 means the boundary by the standard of the BCA forming the data structure for each four rows.

<8> Step SP208

When the ECC synch detection counter 136 is 2 or greater, the process is completed. When the ECC synch detection counter 136 is smaller than 2, the process goes to <9>. When the ECC synch detection counter 136 is 2 or greater, it means that the process is terminated when two or more than two among four ECC synch are detected.

<9> Step SP209

The register 132 is sequentially shifted by one bit unit, and the process goes to <1>.

It is necessary to obtain the BCA data in the Blu-ray disk. The BCA data needs to be obtained also in the DVD-R or the like since the DVD-R is CPRM-compatible. Therefore, a technique of contributing to improvement of the accuracy of obtaining the BCA data is needed. However, the accuracy of detecting the head of the BCA information data is degrading, which makes it difficult to obtain the BCA data.

SUMMARY

The present inventors have found a problem of the following. That is, in a field of multimedia in which the number of products will be increased from now on, the optical disk may be scratched by the noise due to the influence of the multi media. In this case, the data may not be read out due to the noise since the noise is provided in the same place even when the disk is rotated. Further, in the DVD, the information data length is variable according to the physical format, as is different from the HD DVD or Blu-ray. Therefore, the detection of the end position is also important as well as the detection of the head of the BCA data. In the technique disclosed in Noro, the ECC synch is the termination condition. Therefore, when the ECC synch is not detected, the information data length can be falsely detected.

A first exemplary aspect of the present invention is decoding apparatus includes a burst cutting area (BCA) signal interval measuring device which measures a signal interval of a BCA area and which outputs BCA signal interval information, a T converter which obtains T information from the BCA signal interval information, a sequencer which detects a space area based on a first threshold value and which outputs an output enable signal based on the T information and a detecting result, wherein the output enable signal shows that a signal is obtained from a data area of the BCA area, and the space area is a non-signal area of the BCA area, and a channel data converter which converts the T information into channel data based on the output enable signal from the sequencer.

According to the present invention, the start point of the BCA area is detected by detecting the non-signal space area (blank area) existing in the BCA area. Accordingly, it is possible to obtain more accurately the BCA data (information data).

According to the present invention, it is possible to provide a decode device, a reproduction apparatus, and a method for decoding capable of detecting the start position of the BCA area with much higher accuracy.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 14 shows a BCA data structure of the Blu-ray;

FIG. 15 is a diagram showing a 1-out-of-4 modulation conversion table;

FIG. 16 is a diagram showing a BCA SyncByte pattern;

DETAILED DESCRIPTION OF THE EXEMPLARY EMBODIMENTS

The specific exemplary embodiments to which the present invention is applied will be described in detail with reference to the drawings. The exemplary embodiments are the ones in which the present invention is applied to a reproduction apparatus detecting a blank area (space area) by a signal interval and continuity thereof. In the exemplary embodiments, the space area is employed as an information data head detection condition. To be more specific, an end detection position of the space area is detected as the head of the BCA signal, which makes it possible to read out the signal in the BCA area even when the BCA head pattern data includes a noise. Note that it is also possible to employ the first synchronization pattern, the BCA Preamble, and the second synchronization pattern for detection by combining them, as in the technique disclosed by Noro. In this specification, the area where the signal is not formed in the BCA area is referred to as space area or blank area. The BCA area typically includes the space area.

First Exemplary Embodiment

Figure 1:
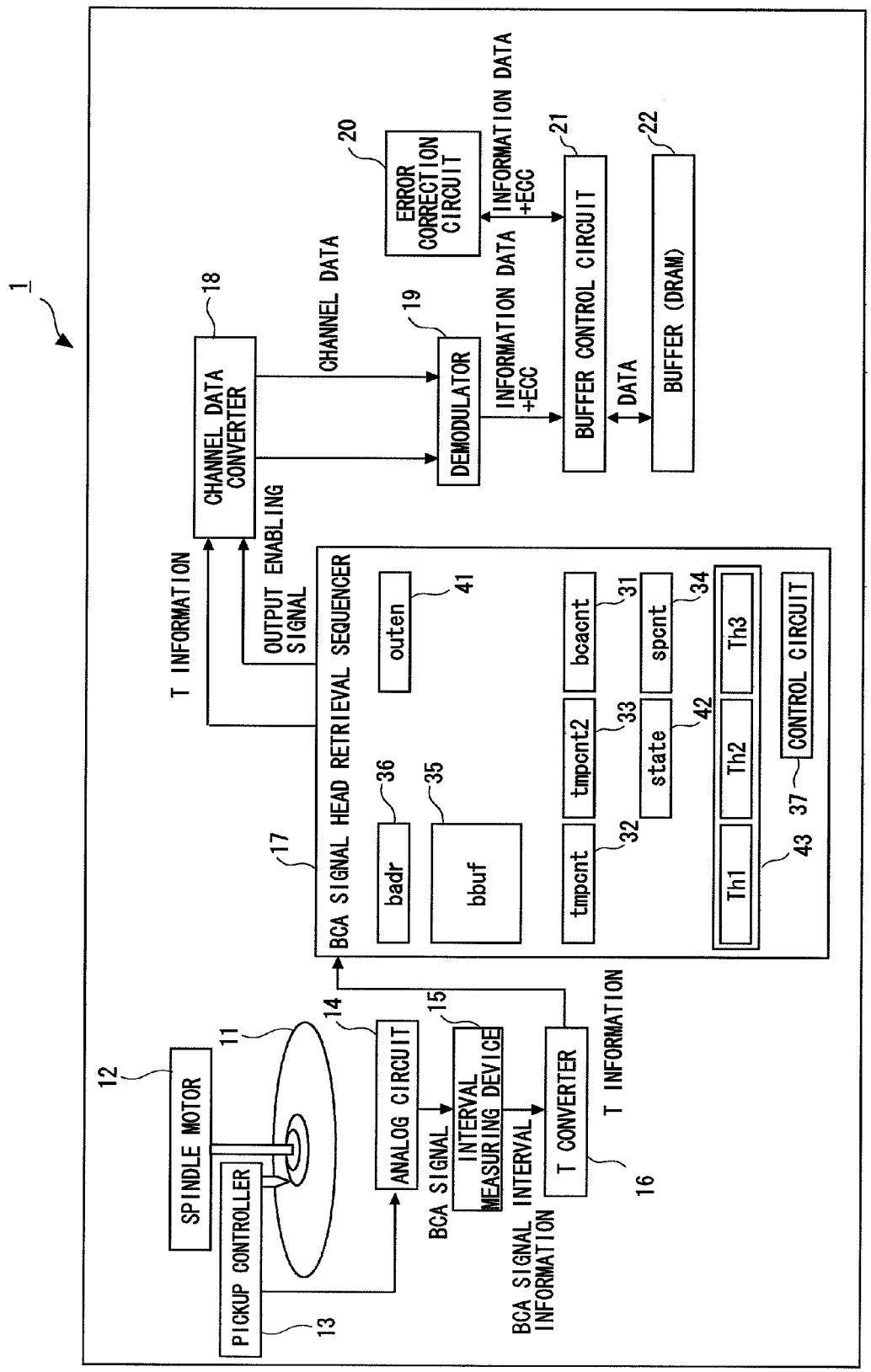
FIG. 1 is a diagram showing a reproduction apparatus according to a first exemplary embodiment of the present invention.

FIG. 1 is a diagram showing a reproduction apparatus according to the exemplary embodiment of the present invention. A reproduction apparatus 1 includes a disk 11, a spindle motor 12, a pickup controller 13, an analog circuit 14, an interval measuring device 15, a T converter 16, a BCA signal head retrieval sequencer 17, a channel data converter 18, a demodulator 19, an error correction circuit 20, a buffer control circuit 21, and a buffer 22.

The spindle motor 12 controls the rotation of the disk 11. The pickup controller 13 radiates a laser beam and receives the reflection of the laser beam. The analog circuit 14 performs an analog signal processing and an AD conversion processing. The interval measuring device 15 measures signal interval in the BCA area and outputs BCA signal interval information. The interval measuring device 15 measures BCA signal rising edge interval after the digital signal conversion by a timer.

The T converter 16 obtains T information from the BCA signal interval information and generates information of T based on the signal interval measured by the interval measuring device 15. The BCA signal head retrieval sequencer 17 performs BCA signal head retrieval based on the information of T. In other words, the BCA signal head retrieval sequencer 17 outputs an output enable signal indicating that the signal is obtained from the data area of the BCA area based on the T information. The BCA signal head retrieval sequencer 17 detects a space area which is a non-signal area existing in the BCA area by a first threshold value Th1 described later and outputs the output enable signal based on the detection result.

The BCA signal head retrieval sequencer 17 accumulatively adds the T information in the area which is likely to be the space area and compares the result of accumulative addition with the first threshold value employing a second threshold value Th2 described later, so as to detect the space area. The second threshold value determines whether the BCA signal interval is within the predetermined range or within the standard. To be more specific, the BCA signal head retrieval sequencer 17 compares the second threshold value determining whether the BCA signal interval is within the range of the standard with the T information. Then the T information is accumulatively added when the signal interval outside of the range of the standard is detected until when the T information from the data area is input. Then the T information which is accumulatively added is compared with the first threshold value, so as to detect the space area.

Now, it is determined that the T information from the data area is input when the T information within the standard is detected. In this case, as will be described later in detail, the T information is accumulatively added when the T information within the range of the standard is detected after the signal interval outside of the range of the standard is detected. Then the T information which is accumulatively added is compared with a third threshold value for determining that the T information from the data area is obtained, so as to determine that the T information from the data area is input.

The channel data converter 18 converts the T information into the channel data based on the output enable signal from the BCA signal head retrieval sequencer 17 and generates the channel data from the information of T. The demodulator 19 retrieves the head position of the information data and demodulates the information data by comparing the channel data with the synchronization pattern and the fixed pattern such as preamble.

The buffer control circuit 21 controls the buffer access. The buffer 22 temporarily stores the data such as the information data. The error correction circuit 20 obtains the information data and the ECC from the buffer through the buffer control circuit so as to perform the error correction. Note that the optical disk is not necessarily fixed one but can be replaceable.

Data is recorded in the BCA area in the inner peripheral part of the disk by a barcode-like pattern having low reflectance formed by an intense laser. For example, the time corresponding to one channel bit interval 1T (speed of 4.917 m/s with radius of 21.6 mm) is 5.8 µs in 2174 rpm in the Blu-ray disk.

The optical disk drive device measures the interval from the rising to the rising of the BCA signal so as to generate the channel data inside thereof and transmit the channel data to the demodulator 19. The demodulator 19 performs synchronization detection, demodulation processing, and buffering. The buffering data is obtained again for performing the error correction, and the data is written back to the buffer.

Now, the BCA signal head retrieval sequencer 17 will be described. The BCA signal head retrieval sequencer 17 includes bcacnt 31, tmpcnt 32, tmpcnt2 (33), spcnt 34, bbuf 35, badr 36, and a control circuit 37. The badr 36 is an address counter of the buffer for temporarily storing the data signal in the BCA area by the amount corresponding to the width indicating that the BCA signal is in the BCA data area. The bbuf 35 is a buffer for temporarily storing the BCA signal by the amount corresponding to the width indicating that the BCA signal is in the BCA data area. The bcacnt 31 is a determination part determining whether the T width from the T converter 16 is within the second threshold value Th2.

The tmpcnt 32 is a counter for counting the detected space width. The tmpcnt 32 counts the T information for the amount needed to determine that the BCA signal is the signal from the BCA data area in addition to the space width. The tmpcnt2 (33) is a counter for counting the detected space width, and receives the count value of the space width from the tmpcnt 32. The spcnt 34 accumulates the T width when the detection T width within the standard is successively detected. The bcacnt 31, the tmpcnt 32, the tmpcnt2 (33), the spcnt 34, the bbuf 35, and the badr 36 are controlled by the control circuit 37. The BCA signal head retrieval sequencer 17 stores Th1, Th2, and Th3 in a storing part 43. The state 42 is changed depending on a result of comparing the threshold values with the count value of the counter, and the output enable signal is output from the output enable signal (outen) output part 41. The operation of the BCA signal head retrieval sequencer 17 will be described later.

Figure 2:
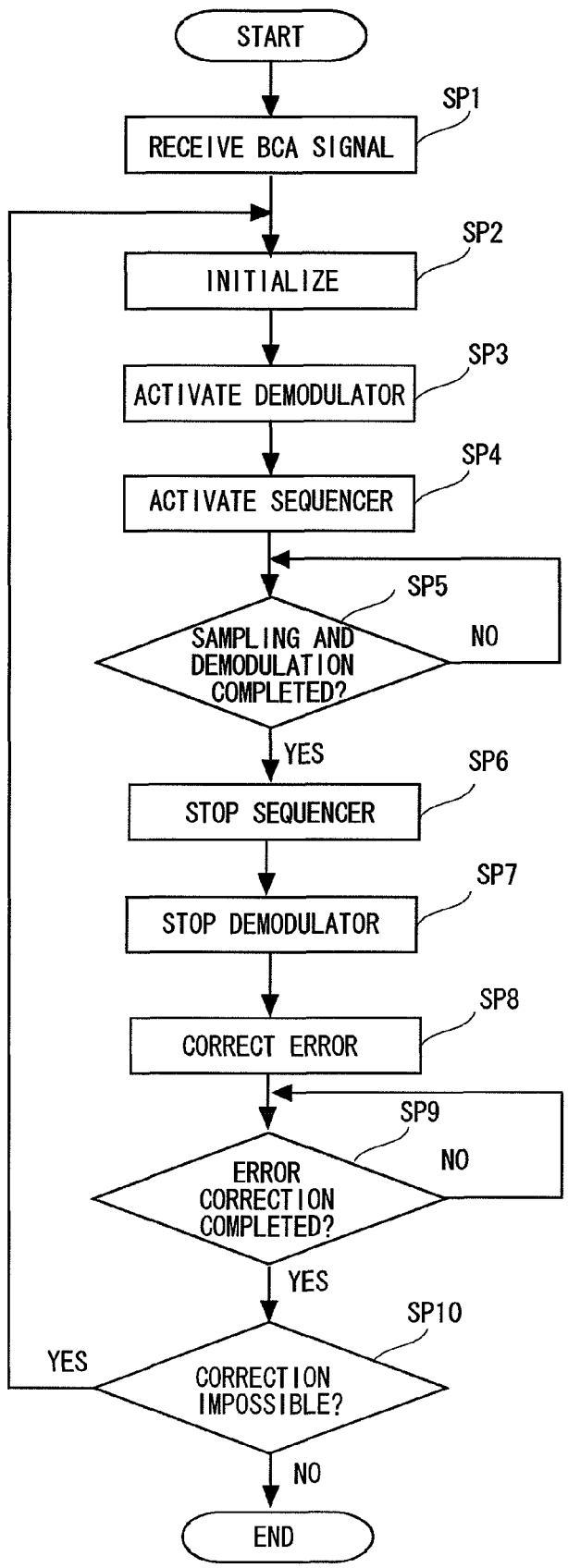
FIG. 2 is a flow chart showing a BCA data acquiring method according to the first exemplary embodiment of the present invention.

First, the BCA data acquiring method will be described. FIG. 2 is a flow chart showing the BCA data acquiring method. The control of each processing is performed from a control circuit (not shown in FIG. 1) such as a micon.

First, in step SP1, the rotation of the disk is controlled and the pick is adjusted so as to draw a BCA signal. Next, the BCA signal head retrieval sequencer 17, the demodulator 19, and the error correction circuit 20 are initialized (step SP2). Then the demodulator 19 is activated so the demodulator 19 waits for the data from the BCA signal head retrieval sequencer (step SP3).

Next, the BCA signal head retrieval sequencer 17 is activated to start the process of determining the T information transmitted from the T converter 16 (step SP4) Then the head of the BCA information data is retrieved. The BCA signal head retrieval sequencer 17 detects the end of the space area or the demodulator 19 detects the synchronization pattern to detect the head of the BCA signal.

When the BCA signal head retrieval sequencer 17 detects the end of the space area, the synchronization pattern and the preamble exist between the end of the space area and the information data; therefore the synchronization pattern and the preamble can be skipped. Otherwise the position of the information data can be detected by the demodulator 19 due to the pattern matching after the end of the space area is detected. Otherwise, even when the BCA signal head retrieval sequencer 17 cannot retrieve the end of the space area, the position of the information data can be detected by the demodulator 19 due to the pattern matching. Therefore the output enable signal is equal to 1.

Next, the retrieval of the end of the BCA information data which is to be obtained is performed. The BCA signal head retrieval sequencer 17 again detects the end of the space area or the demodulator 19 detects the synchronization pattern so as to detect the end of the BCA information data. When the BCA signal head retrieval sequencer 17 detects the end of the space area, the synchronization pattern and the preamble exist between the end of the space area and the information data; therefore the synchronization pattern and the preamble can be skipped. Otherwise, the position of the information data can be detected by the demodulator 19 due to the pattern matching after the end of the space area is detected. Otherwise, even when the BCA signal head retrieval sequencer 17 cannot detect the end of the space area, the position of the information data can be detected by the demodulator 19 due to the pattern matching. When the sampling and the demodulation processing are completed (step SP5), the output enable signal is equal to 0. It is also possible to complete the data acquisition by acquiring the number of data corresponding to the standard (Blu-ray Discdeha 4648 channel bit).

Next, the BCA signal head retrieval sequencer 17 is stopped (step SP6) to prevent the following data from being transferred to the circuits after the channel data converter 18. Then the demodulator 19 is stopped (step SP7) to perform the error correction on the demodulation data (step SP8). Then after the error correction processing has been completed (step SP9), the process goes back to step SP2 to repeat the processing from the sampling again when the error correction result indicates correction impossible (step SP10: Yes). When the error correction result does not indicate the correction impossible, it means that the BCA information data has been obtained.

Next, the head retrieving procedure of the BCA signal of S4 and S5 will be described. First, the outline of the operation of the optical disk drive device to the sampling will be described. In the T converter 16, the value of the threshold value of 1T can be set to the predetermined value or to any value by the control circuit such as a micon.

The interval measuring device 15 performs the sampling on 1T of BCA with sufficiently fine clock. The counter is operated by detecting the rising of the first BCA signal. In the following processing, the information indicating the number of clocks of the BCA signal rising interval is transferred to the T converter 16 as the BCA signal interval information every time the rising of the BCA signal is detected. The BCA signal interval information may be time information instead of the number of clocks.

When the T converter 16 obtains the BCA signal interval information from the interval measuring device 15, the T converter 16 divides the obtained BCA signal interval information by the number of clocks corresponding to 1T to convert the BCA signal interval information to the T information, and transmits the T information to the BCA signal head retrieval sequencer 17. When the BCA signal interval information is treated as the time information, the clock corresponding to 1T is also regarded as the time corresponding to 1T.

For example, the BCA signal interval information is assumed to be 22.04 μs. In the T converter, the value of the threshold value of 1T can be preset to 5.8 μs by the control circuit such as the micon or the like. Since 22.04 μs includes 3.8 of 5.8 μs, the T is calculated as 4T after being rounded off. The T converter 16 transmits the value of 4 to the BCA signal head retrieval sequencer 17. The BCA signal head retrieval sequencer 17 outputs the T information to the channel data converter 18. Note that the output enable signal is set to 1 only in the BCA signal area. The channel data converter 18 converts the obtained T information to the channel data, transmits the channel data to the demodulator 19, and outputs the output enable signal to the demodulator 19. When the output enable signal obtained from the channel data converter 18 is equal to 1 or when the data corresponding to the information data can be detected by detecting the synchronization pattern, the demodulator 19 buffers this data to the buffer 22 by way of the buffer control circuit 21.

The T information can also be obtained by the following method. The interval measuring device 15 transmits the count up signal to the T converter every time the number of clocks corresponding to 1T passes. The BCA signal interval time which is measured here is initialized and transferred to the T converter, and cleared to 0 every time the BCA signal is detected. The T converter receives the count up signal and counts up the T information. The interval measuring device 15 transmits the rest of the number of clocks to the T converter when the BCA signal is detected and then clears the BCA signal interval time to 0. The T converter adds 1 to the T information (round-off) when the value is ½ or greater of the number of clocks corresponding to 1T. The T converter transmits the calculated T information to the BCA signal head retrieval sequencer. The T information is cleared to 0 immediately after being initialized or being transferred to the BCA signal head retrieval sequencer. When the T information is obtained as described above, it is not needed to provide a divider, whereby the hardware amount can be reduced.

Next, the operation of the BCA signal head retrieval sequencer 17 will be described. The BCA signal head retrieval sequencer 17 compares the threshold values Th1, Th2, and Th3 described above which are predetermined or can be set to any value designated by the control circuit such as the micon with the T information. Then the BCA signal head retrieval sequencer 17 sets the output enable signal to 1 when the signal of the head of the BCA signal area is detected from the signal of the end of the BCA signal area. In this case, the BCA signal head retrieval sequencer 17 transfers all the T information that is obtained to the channel data converter 18. Further, the BCA signal head retrieval sequencer 17 sets the output enable signal to 0 and samples the data of one cycle of the BCA signal area when the signal of the head of the BCA signal area is detected from the signal of the end of the BCA signal area for the second time. Further, the termination instruction is output from the control circuit such as the micon to the BCA signal head retrieval sequencer 17 when a certain number of samplings is obtained so that the state of the BCA signal head retrieval sequencer 17 is forced to be transited to INIT. Then the completion is notified to the control circuit such as the micon with the output enable signal of 0.

Figure 3:
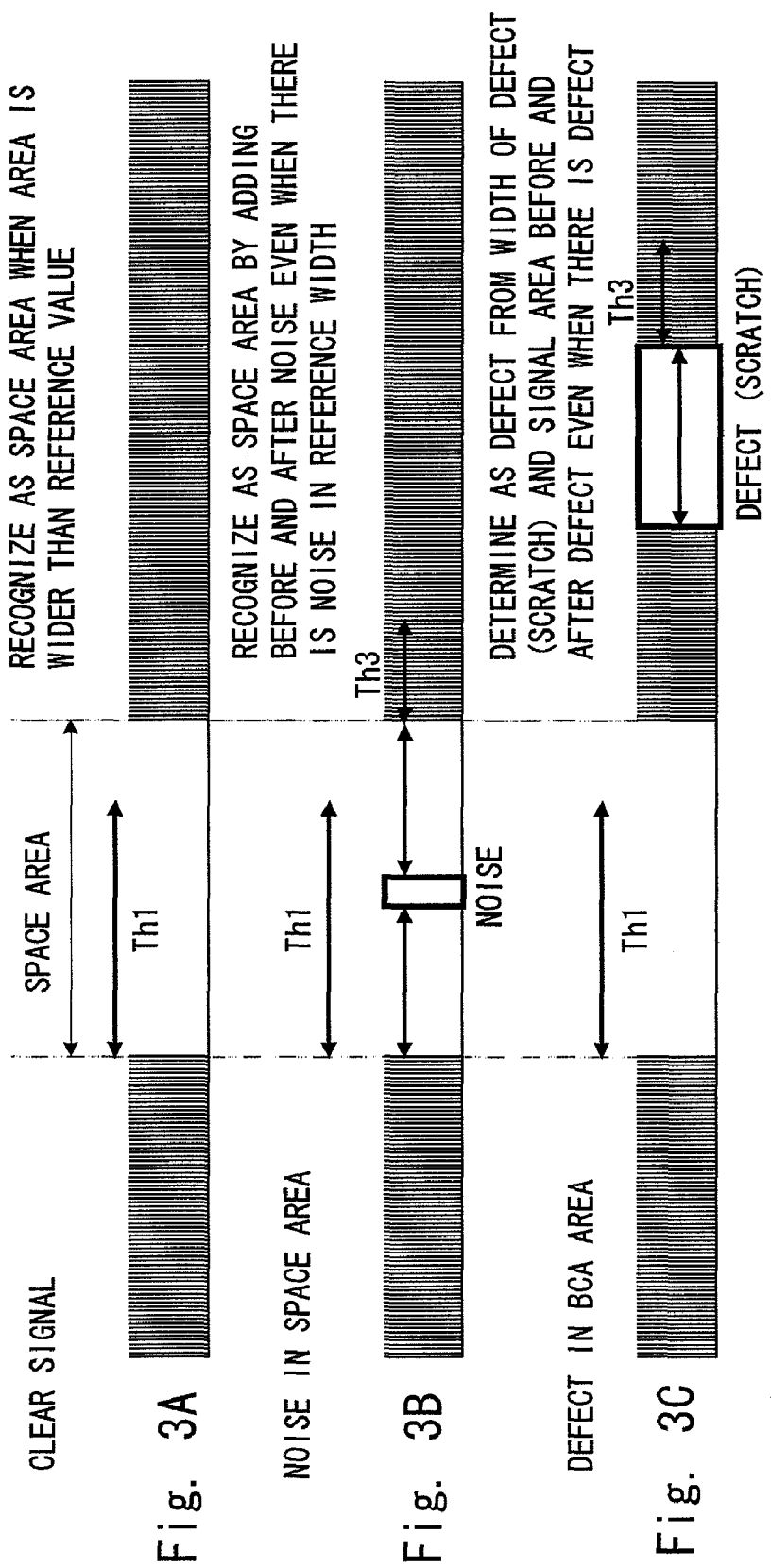
FIG. 3A is a diagram showing a data area and a space area of a BCA area and shows a case in which there is no noise included.
FIG. 3B is a diagram showing a data area and a space area of a BCA area and shows a case in which there is a noise in the space area.
FIG. 3C is a diagram showing a data area and a space area of a BCA area and shows a case in which there is a noise in the data area.

FIGS. 3A-3C are diagrams showing the data area and the space area of the BCA area. FIG. 3A shows a case in which there is no noise included, FIG. 3B shows a case in which there is a noise in the space area, and FIG. 3C shows a case in which there is a noise in the data area. As shown in FIG. 3A, the BCA area ideally includes only the space area (non-signal area: the area where there is no change of the signal) and the data area. When the non-signal area is larger than Th1, the BCA signal head retrieval sequencer 17 recognizes the non-signal area as the space area so as to be able to detect the head of the signal of the BCA area.

On the other hand, when there is a noise in the space area as shown in FIG. 3B, the width of the space area is smaller than Th1. In this case, the space area cannot be detected only by the threshold value Th1. Therefore, in the present exemplary embodiment, even when there is a noise in the space area, the space width before and after the noise is added to recognize the area as the space area. The threshold value for determining whether the current T information is the data signal or not is Th2. The threshold value Th3 is the one for detecting the data signal which is repeated for a plurality of times and determining that the T information from the data area is obtained. It is determined by this threshold value whether the area following the noise or the space area is the data area or not.

Further, when the area is detected as blank due to the defect such as the scratch generated in the BCA signal area as shown in FIG. 3C, this may be falsely detected as the space area. In the present exemplary embodiment, even when there is a defect, it is determined as defect from the width of the defect and the signal area before and after the defect, and then if it is not determined as a defect, the defect is neglected. In order to discover the space area with accuracy even when there is scratch or defect as well as the clear signals, the present exemplary embodiment uses the three threshold values described above. The threshold value Th1=Y for detecting the space area is about 90T, the threshold value Th2=N for detecting the signal of the BCA signal area is about 6T, and the threshold value Th3=Z for detecting the BCA signal area is about 20T.

Note that these values are employed in the Blu-ray as an example. Although the present exemplary embodiment describes a case in which there is a noise in the data area and the space area of the BCA area, the space area can be detected only by the threshold value Th1 when there is no noise. When the threshold value Th2 is employed with the threshold value Th1, it is possible to detect the area as the data area. It is possible to detect by the threshold value Th1 that the area is the space area and by the threshold value Th2 that the area is not the data area; in this case the area is highly likely to be the space area.

Figure 4:
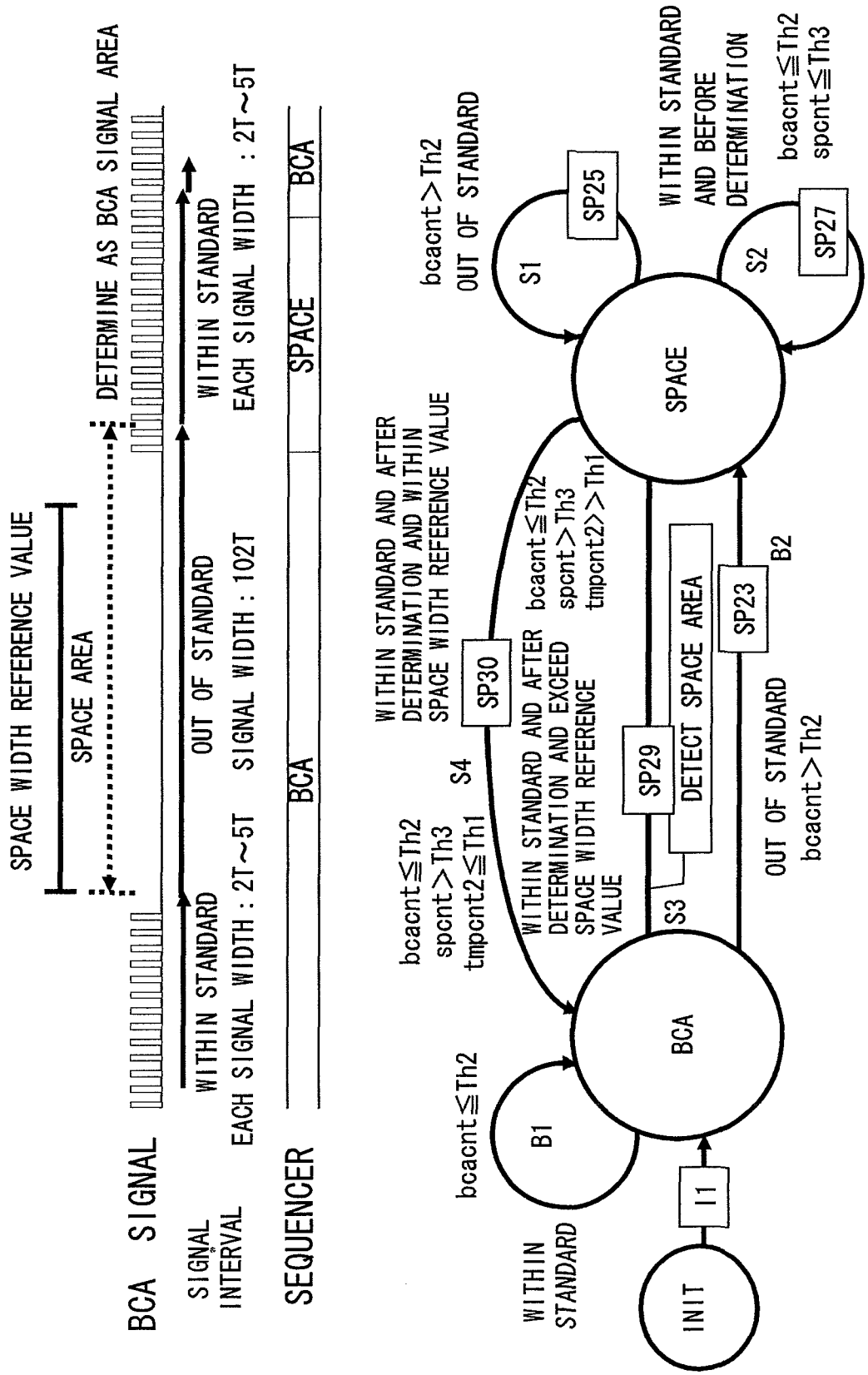
FIG. 4 is a diagram describing an operation of a BCA signal head retrieval sequencer of the reproduction apparatus according to the first exemplary embodiment of the present invention.
Figure 5:
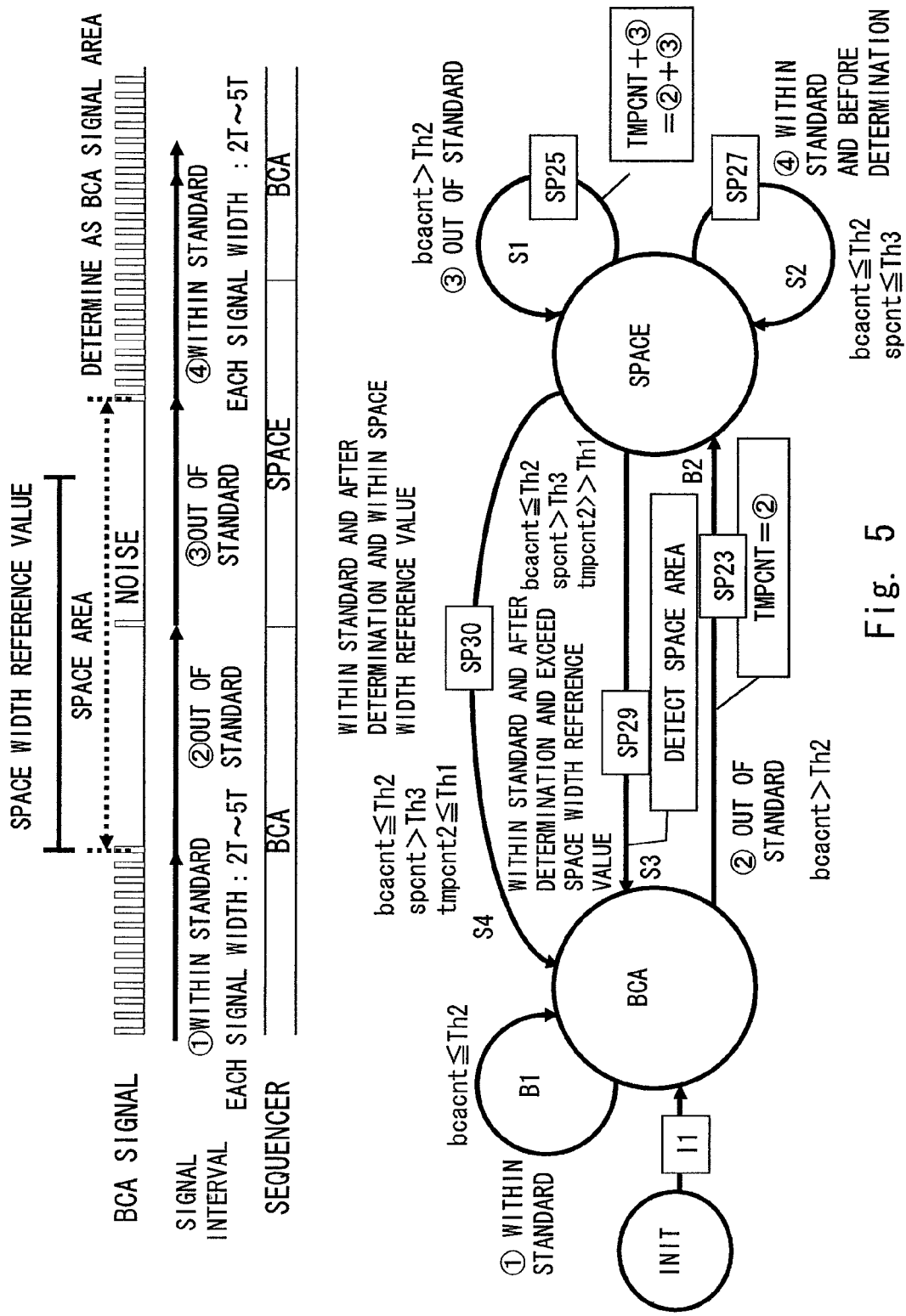
FIG. 5 is a diagram describing an operation of the BCA signal head retrieval sequencer of the reproduction apparatus according to the first exemplary embodiment of the present invention.
Figure 6:
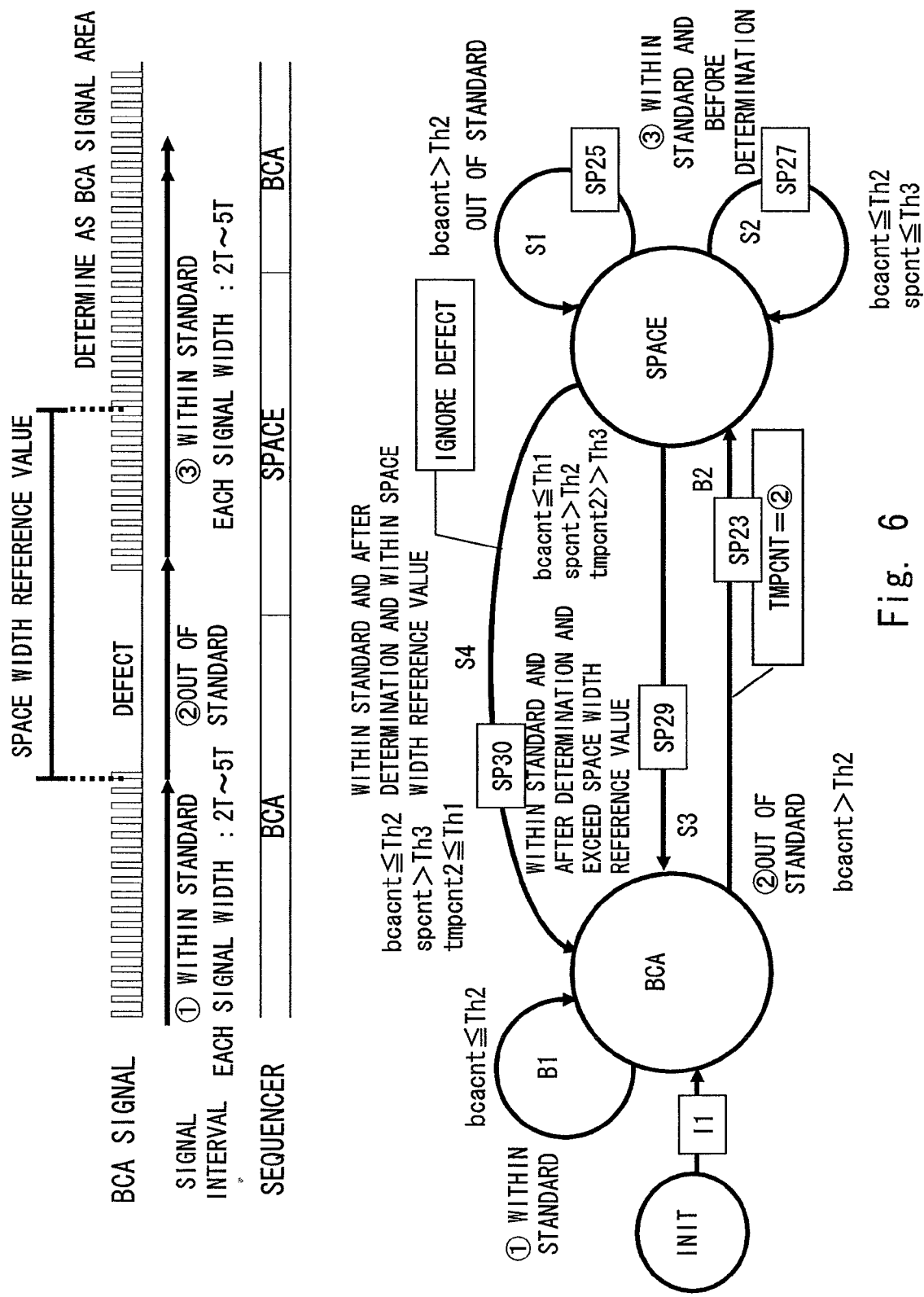
FIG. 6 is a diagram describing an operation of the BCA signal head retrieval sequencer of the reproduction apparatus according to the first exemplary embodiment of the present invention.

First, the outline of the operation of the BCA signal head retrieval sequencer 17 will be described. FIGS. 4 to 6 each shows a diagram for describing the operation of the BCA signal head retrieval sequencer 17. In the drawings, bcacnt, tmpcnt2, and spcnt indicate the accumulated values of the T information which are counted or set in the bcacnt 31, the tmpcnt2 (33), and the spcnt 34. Further, SP23, SP25, SP27, SP29, and SP30 correspond to each step of FIG. 7 described later. When there is no noise in the data area and the space area, the T information is determined as equal to or below the Th2 in the data area and the process passes through B1 loop, as shown in FIG. 4. In the space area, the process passes through B2 and the state transits to SPACE$_{state}$. Then in the data area again, the accumulated T width exceeds Th3. Then the process passes through S4, and the BCA signal head retrieval sequencer 17 again becomes BCA$_{state}$.

On the other hand, as shown in FIG. 5, when there is a noise in the space area, the process passes through B1 loop of the BCA$_{state}$ in the first data area, and the process passes through B2 in the first noise of the space area to move to SPACE$_{state}$. Since the state is SPACE$_{state}$ with the signal of the head of the BCA signal area, the process passes to the S1 loop. Since the accumulating result of the T information exceeds Th3 in the data area and the count value of the tmpcnt2 (33) counter exceeds Th1, the process passes through S3 and the BCA signal head retrieval sequencer 17 again becomes BCA$_{state}$. In this case, since the process passes through S3, the output enable signal is equal to 1.

When the process passes through the defect existing in the data area, the process passes through the B1 to B2 after passing the defect and the state becomes the SPACE$_{state}$, as shown in FIG. 6. After that, since the count value of the tmpcnt2 (33) counter does not exceed Th1 although the T width accumulating result exceeds Th3, the process passes through S4 and the state becomes the BCA$_{state}$. In this case, the process passes through S4; therefore the output enable signal is not changed, as is different from the above case.

Figure 7:
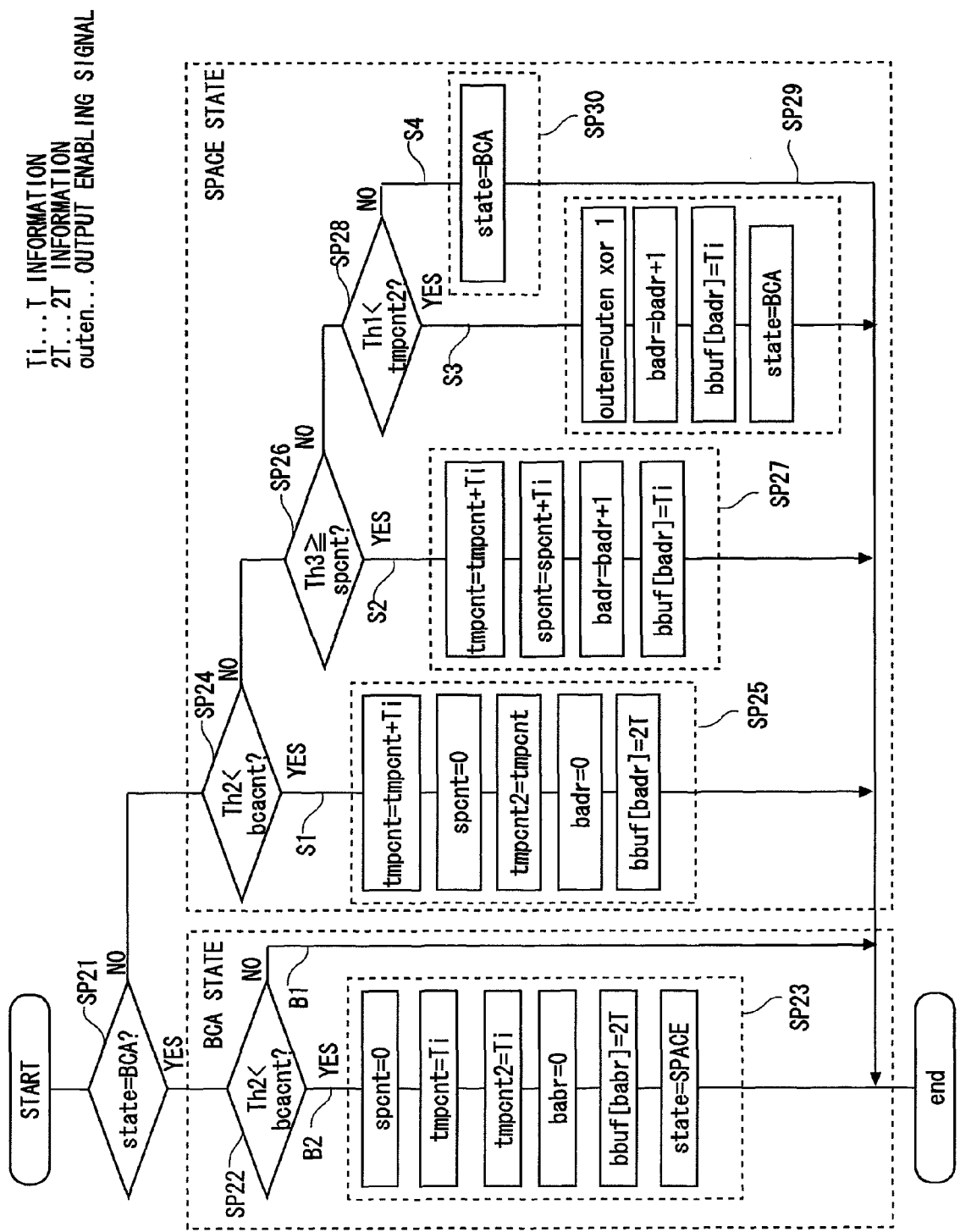
FIG. 7 is a flow chart showing an operation of the BCA signal head retrieval sequencer of the reproduction apparatus according to the first exemplary embodiment of the present invention.
Figure 8:
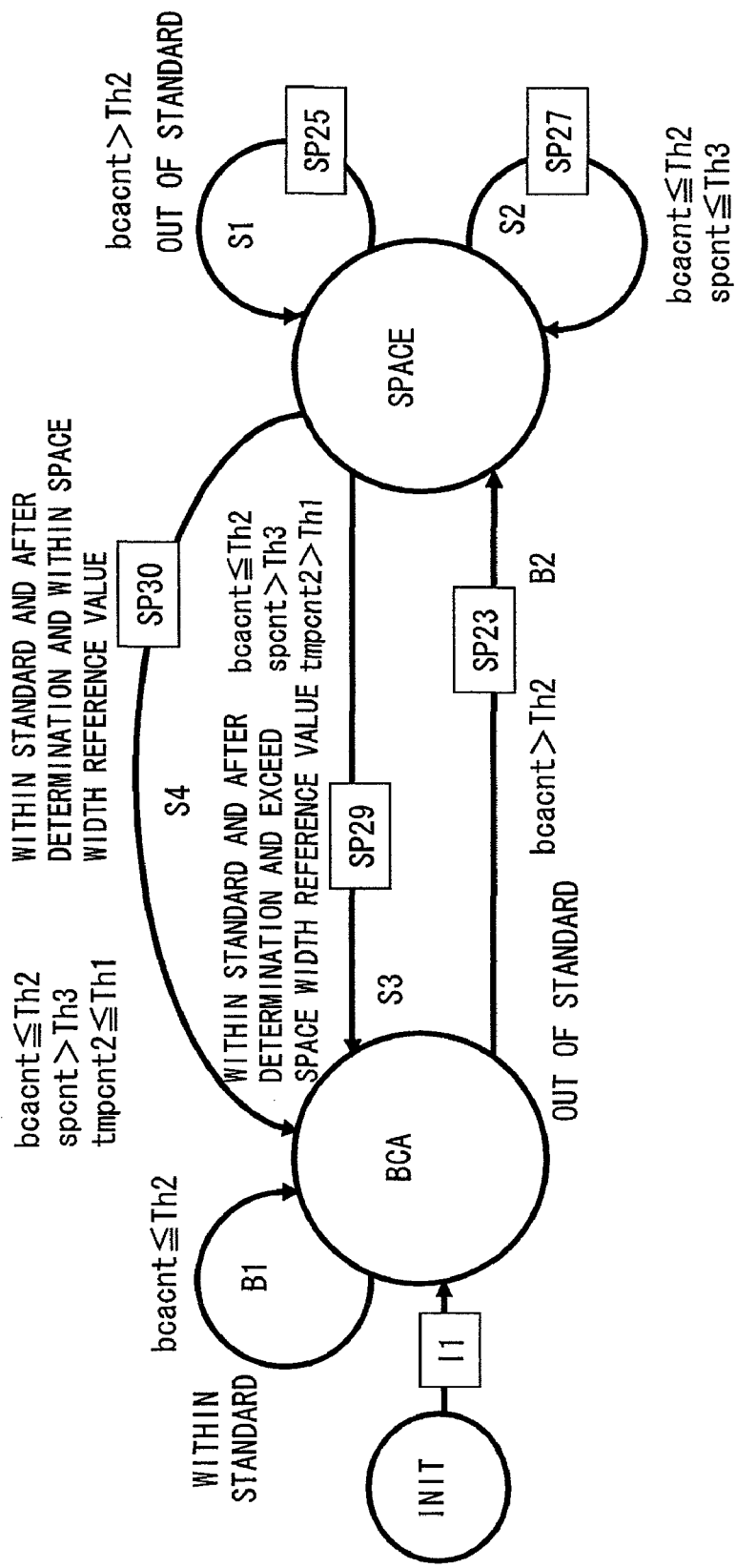
FIG. 8 is a schematic diagram showing a state transition of the BCA signal head retrieval sequencer of the reproduction apparatus according to the first exemplary embodiment of the present invention.
Figure 9:
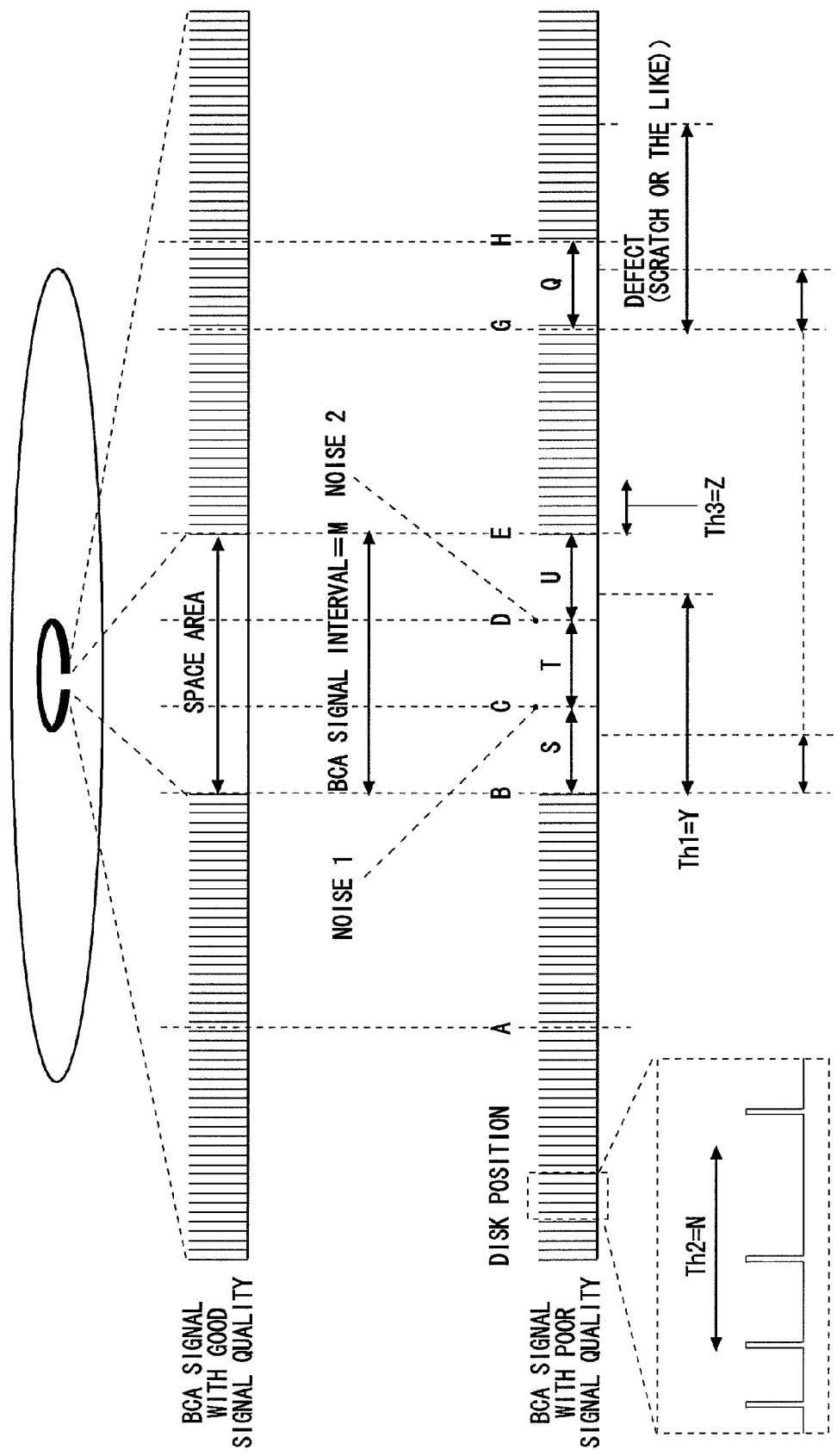
FIG. 9 is a schematic diagram showing a relation between Th1 to Th3 and a size of a scratch on a disk.

Referring now to FIGS. 7 to 9, the detailed operation of the BCA signal head retrieval sequencer will be described. FIG. 7 is a flow chart showing the operation of the BCA signal head retrieval sequencer. FIG. 8 is a schematic diagram showing a state transition of the BCA signal head retrieval sequencer. FIG. 9 is a schematic diagram showing a relation between Th1 to Th3 with the size of the scratch on the disk. The description will be made here on an example which can be a problem in performing the BCA signal head retrieval. FIG. 7 is a flow chart regarding the output enabling control and omits the T information acquisition from the T converter 16 and the data output to the channel data converter 18. As shown in FIG. 8, the initial state is set to INIT. When the current state is INIT, the output enable signal is always set to 0. In starting the sampling, the initializing process is performed when the INIT$_{state}$ is transited to the BCA$_{state}$. The sampling is stopped from the external system such as the micon, and the sampling is started again from the initial state INIT when the sampling is restarted.

Now, a case of the BCA signal having poor signal quality will be described, as shown in FIG. 9. In other word, we assume a case in which the noise is generated in the space area and a case in which the signal itself is missing by the defect such as the scratch in the BCA signal area. As shown in FIG. 9, the BCA signal interval of the space area is set to M, the signal interval from the signal of the end of the BCA signal area to the noise 1 is set to S, the signal interval from the noise 1 to the noise 2 is set to T, the signal interval from the noise 2 to the signal of the head of the BCA signal area is set to U, and the width of the defect in the head of the BCA signal area is set to Q.

M indicates the typical width of the space area. M is 102T in the Blu-ray.

Q indicates the width of the defect in a level which can be discerned from the space area. Q is about 50T in the present exemplary embodiment.

The threshold values Th1=Y, Th2=N, Th3=Z are set. The threshold values typically have the following relation with each BCA signal interval in the example of FIG. 9.

Th1=Y: around 90% of the space area. Th1 has the set value sufficiently large for distinguishing the space area from the defect. Th1 can be about 90T in the Blu-ray. Note that the Th1 may be from 70T to 95T instead of 90T, for example.

Th2=N: set value of a degree which can determine the standard width of the BCA signal. Th2 can be about 6T which is somewhat larger than 2T to 5T in the Blu-ray, for example. Note that Th2 may be 7T and 8T instead of 6T.

Th3=Z: width for determining that the signal in the BCA signal standard again continues from the space area. Th3 is about 20T in the present exemplary embodiment. The area can be determined as the BCA signal area if the area smaller than 6T continues for 20T or more. Th3 can be about 15T to 30T. In the present exemplary embodiment, all the BCA signal intervals other than the noise or the defect are smaller than N. The sampling start point is described as the A point of FIG. 9.

<A1>

In starting the sampling, the state transits from the INIT$_{state}$ to the BCA$_{state}$ (FIG. 7: step SP21, FIG. 8: I1).

<A2>

After the sampling is started from the A point of FIG. 9, the bcacnt 31 compares the T information input from the T converter 16 with the Th2 every time the T information is input. Since all the BCA signal intervals (T information) obtained to the signal of the end of the BCA signal area (disk position B) are smaller than N (step SP21: No), the process passes through B1 of FIGS. 7 and 8. The BCA signal head retrieval sequencer 17 determines whether the T width is larger than the threshold value Th2 by the bcacnt 31 to confirm that the BCA signal interval is smaller than N or is in the BCA signal area.

<A3>

Next, since the T information (signal interval S) obtained from the signal of the end of the BCA signal area (disk position B) to the noise 1 (disk position C) is larger than Th2 (N=6T) (step SP22: Yes), the process passes through B2 of FIGS. 7 and 8 (SP23). In this case, 0 is assigned to the spcnt 34, the T information is assigned to the tmpcnt 32 and tmpcnt2 (33), the badr 36 is initialized to 0, the T information indicating 2T of the initial value is assigned to the bbuf 35 indicated by badr, and the SPACE is assigned to the state. Therefore, the state is transited to the SPACE$_{state}$. The spcnt 34 is the counter which is reset to 0 when the T width of the bcacnt 31 is larger than the threshold value Th2 (out of the standard), and the spcnt 34 accumulatively adds the value of the T information from the T converter 16 until being reset. The tmpcnt 32 is the counter which is reset when the state is changed from BCA to SPACE, and the total width of the space which is detected is accumulatively added. The tmpcnt2 (33) is a register storing the value of tmpcnt 32 when the value of bcacnt is out of the standard, or when the state transits from BCA to SPACE and the process passes through S1 with SPACE$_{state}$.

<A4>

Since the T information (signal interval T) obtained from the noise 1 (disk position C) to the noise 2 (disk position D) is also larger than Th2=N, the process passes through S1 of FIGS. 7 and 8. In summary, the state is the SPACE$_{state}$; therefore step SP21 of FIG. 7 is No. Since the signal interval is larger than N, step SP24 is Yes, and the step goes to SP25. In this case, the T information is added in the tmpcnt 32, 0 is assigned to the spcnt 34, the tmpcnt is assigned to the tmpcnt2 (33), the badr is initialized to 0, and the T information indicating 2T of the initial value is assigned to the bbuf indicated by badr.

<A5>

Since the T information (signal interval T) obtained from the noise 2 (disk position D) to the signal of the head of the BCA signal area (disk position E) is also larger than Th2=N, the process passes through S1 in FIGS. 7 and 8. Therefore, the T information is added in the tmpcnt 32, 0 is assigned to the spcnt 34, the tmpcnt is assigned to the tmpcnt2 (33), the badr is initialized to 0, and the T information indicating 2T of the initial value is assigned to the bbuf indicated by badr.

<A6>

The BCA signal interval (T information) after the signal of the head of the BCA signal area (disk position E) is continuously less than Th2=N (within the standard) The state passes through S2 during the time at which the total value of the BCA signal interval or the value of the spcnt 34 does not exceed Z. Therefore, the T information is added to the tmpcnt 32, the T information is added to the spcnt 34, the badr 36 is incremented, and the detected T information is assigned to the bbuf 35 indicated by the badr 36. The bbuf 35 is a buffer holding the T information from the time at which it is not determined whether the signal in the BCA area is the data signal, the noise, or the space area to the time at which it is determined that the signal is in the data area. The value of the bbuf 35 is transmitted to the data buffer when the area is determined as the BCA data area. Therefore, it is possible for the data buffer to start the buffering from the time at which it is determined that the signal is in the BCA data area. In summary, although the data buffer requires all the data in the BCA data area, the first data of the predetermined area is not buffered until the time it can be determined whether the area is the data area or not.

<A7>

The BCA signal interval after the signal of the head of the BCA signal area (disk position E) is continuously less than Th2=N. Since the total value Z1 of the BCA signal interval or the value of the spcnt 34 exceeds Z and the tmpcnt2 (33) exceeds Th1=Y in S+T+U, the state passes through S3. The spcnt 34 is compared with Th3 every time the T information from the T converter 16 is input. It is determined whether the value of the tmpcnt2 is equal to or larger than Th1 when the value exceeds Th3 so as to determine which of S3 or S4 is passed. That is, it is determined whether the output enable signal is inverted or not.

Figure 10:
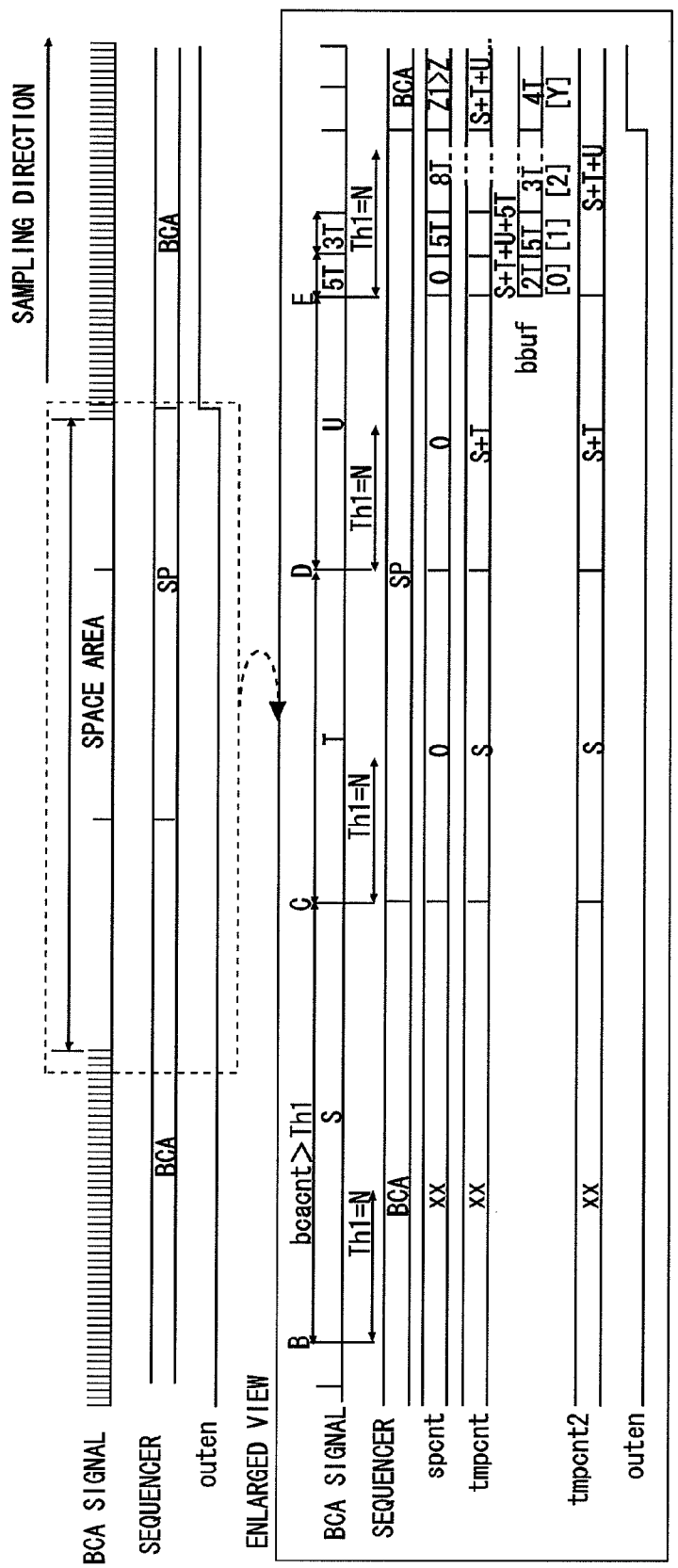
FIG. 10 is a timing chart showing a flow from the time at which the BCA signal is read out at the point A to the time at which an output enable signal becomes 1.

Since the value of the tmpcnt2 exceeds Th1, the outen signal is inverted to set the output enable signal to 1. The outen signal inverts from the current state every time the process passes through S3. The badr 36 is incremented, the detected T information is assigned to the bbuf 35 indicated by badr, and BCA is assigned to the state. Accordingly, the state is transited to the BCA$_{state}$. The badr 36 is reset to 0 when the T information out of the standard is input. FIG. 10 is a timing chart showing the above-described flow. The BCA signal head retrieval sequencer 17 transfers the T information stored in the bbuf 35 to the channel data converter 18 by the next sampling. When the outen is equal to 1, the BCA signal head retrieval sequencer 17 transfers the T information received from the T converter 16 directly to the channel data converter 18.

<A8>

Then the BCA signal interval (T information) is always smaller than Th2=N until the defect in the BCA signal (disk position G); therefore the process passes through B1 (step SP22: No, see FIG. 7).

<A9>

Since the T information from the position at which the signal is missing due to the defect (disk position G) to the position at which the signal is recovered (disk position H) exceeds Th2=N; therefore the process passes through B2 and the state transits to SPACE$_{state}$ (step SP22: Yes, see FIG. 7). The process in B2 includes the processing in which 0 is assigned to the spcnt 34, the T information is assigned to the tmpcnt 32 and the tmpcnt2 (33), the badr 36 is initialized to 0, the T information indicating 2T of the initial value is assigned to the bbuf 35 indicated by badr, and the SPACE is assigned to the state.

<A10>

Figure 11:
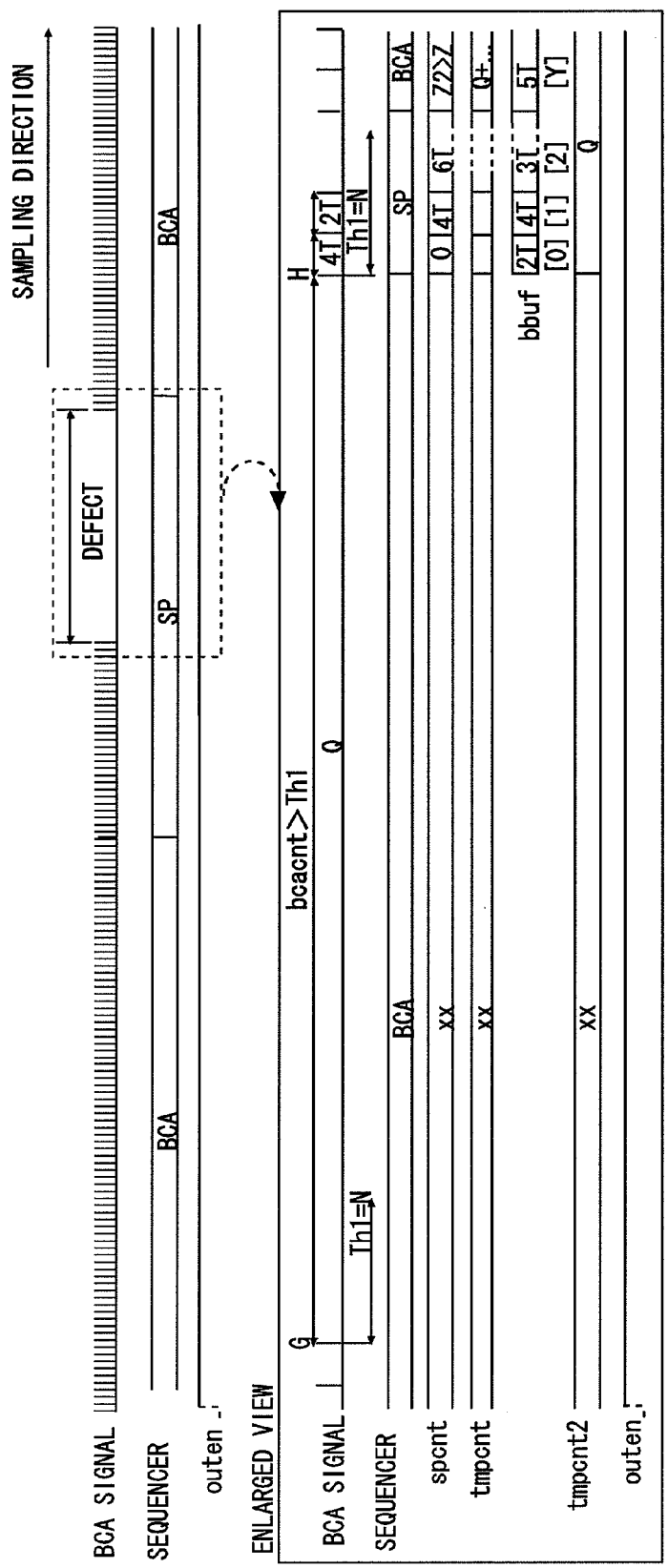
FIG. 11 is a timing chart showing a flow when the noise in the BCA data area is read out.

In the following process, the T information is continuously less than Th2=N, and the value of the spcnt 34 which is the total value Z2 of the BCA signal interval exceeds Th3=Z. However, since the tmpcnt2 (33) is less than Th1=Y in Q, the process passes through S4 and the state transits to the BCA$_{state}$. FIG. 11 is a timing chart showing the above-described flow.

<A11>

Since the BCA signal interval (T information) is always smaller than Th2=N from the position at which the signal is recovered (disk position H) to the position at which the signal of the end of the BCA signal area (disk position B) is detected; therefore the process passes through B1 (FIGS. 7 and 8). In this case, the disk is rotated one circle and B1 is passed to the signal of the end of the BCA signal area again.

<A12>

When the data of one rotation of the disk is read out and the signal of the head of the BCA signal area (disk position E) is detected again from the signal of the end of the BCA signal area (disk position B), B2 is passed since the T information indicating the BCA signal interval exceeds Th2=N. The process in B2 includes the processing in which 0 is assigned to the spcnt 34, the T information is assigned to the tmpcnt 32 and the tmpcnt2 (33), the badr 36 is initialized to 0, the T information indicating 2T is assigned to the bbuf35 indicated by badr, and the SPACE is assigned to the state. Accordingly, the state is transited to the SPACE$_{state}$.

After <A13>, the T information is continuously less than Th2=N, and the total value Z3 of the BCA signal interval exceeds Th3=Z. Since the tmpcnt2 (33) in this case exceeds Th1=Y, the process passes through S3 and the outen signal is inverted to complete the sampling.

The above process is the same as that described in FIG. 10. Some media such as the HD DVD and the Blu-ray disk do not need the following sampling if the information data has a fixed length and a certain number of samplings is obtained. In these media, the process from A11 to A13 can be replaced with the following process of A11a, or the process from A11 to A13 can be combined with the process of A11a.

<A11a>

When any number of sampling which can be regarded as one circle of the disk is obtained, the control circuit such as the micon stops the BCA signal head retrieval sequencer 17 to complete the sampling.

The any number of sampling which can be regarded as one circle of the disk is 4648T in the case of the Blu-ray. When it is desirable to provide the margin in the sampling number due to the noise or the like in the BCA signal, the sampling of $4648T+\alpha$ may be performed. In this case, although extra sampling is performed, the position of the information data can be recognized by the synchronization pattern in the demodulation; therefore the undesired data can be excluded.

Further, as is the same as the technique of Noro, it is also possible to employ the method of detecting the head of the BCA data when the reproduced data matches at least two data of the reference patterns of the first synchronization pattern ($SB_{3,3}$), the preamble data (BCA Preamble), and the second synchronization pattern ($SB_{0,0}$).

Now, the demodulator 19 will be described. However, the description will be made in accordance with the Blu-ray standard. The demodulator 19 performs the reference positional correction and the demodulation processing for retrieving the synchronization pattern and detecting the synchronization pattern. $SB_{3,3}$ (corresponding to $SB_{BCA}$ disclosed by Noro), the preamble, and $SB_{0,0}$ (corresponding to $RS_{BCA1}$ disclosed by Noro) for the data transmitted from the channel data converter 18 are retrieved. Then the reference position is fixed at the time of detecting a certain amount of data. Then a window having any width with a center of an expected interval from the detected synchronization pattern to the next synchronization pattern is generated. When the synchronization pattern is detected at a position other than the center of the expected interval, the positional information is corrected and the deviation between the synchronization patterns is corrected. Further, when the synchronization pattern is not detected, free-running operation is forced to be performed at the expected interval. The detected synchronization pattern position is regarded as the reference position, and the period before and after the reference position for a plurality of channel bits is provided. When the synchronization pattern is detected in this period, the synchronization pattern is regarded as the detection position. The window is the period for setting the detection position to the reference position. The free-running operation means the operation of setting the detected synchronization pattern position to the reference position and setting the next synchronization pattern position determined from the standard to the expected position.

The demodulation is the process of demodulating the data that can be expected from the position fixed by the synchronization pattern retrieval. The fixed position is the position after being determined at the free-running operation and the window correction. Since the information data has the fixed length regarding the HD DVD and the Blu-ray, the demodulation of the fixed data length is the termination condition. The information data of the DVD has the variable length in a unit of four rows×N; therefore the termination condition is that the $RS_{BCA13}$ is detected for four times continuously, or the $RS_{BCA14}$ is detected, or the output enable signal from the BCA signal head retrieval sequencer becomes 0. Since the fixed pattern 55h continues for four bytes as the preamble, it can be regarded as the termination condition in the light of the positional relation of the above three conditions.

In the present exemplary embodiment, the space area and the synchronization pattern improve the accuracy of obtaining the BCA information data, and the error correction after the demodulation can be performed by a known method.

Figure 12:
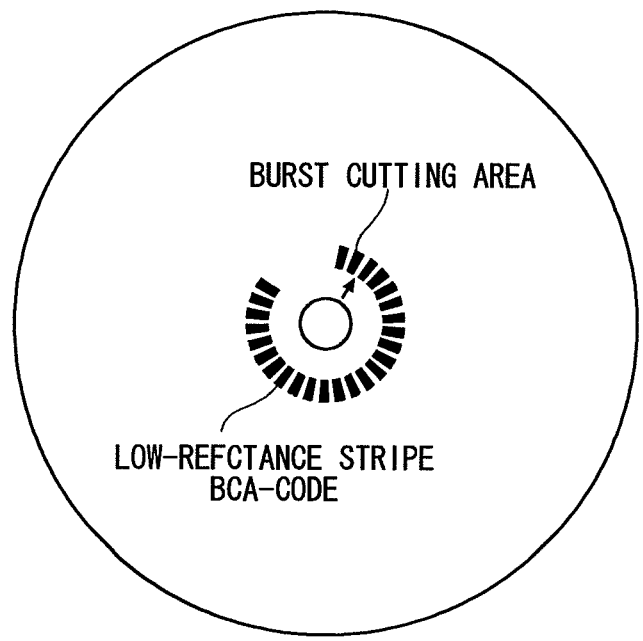
FIG. 12 shows a position of the BCA area on a disk.

Now, the BCA standard will be described. In this specification, the BCA standard of the Blu-ray disk is described as a representative example. However, the same data recording format of barcode-like pattern is employed also in the DVD and the HD DVD. BCA means Burst Cutting Area. FIG. 12 shows a position of the BCA area on the disk. The BCA area is located in the inner peripheral part of the disk. Data is recorded in a radial direction in the BCA area by a barcode-like pattern having low reflectance formed by an intense laser in a manufacturing process. The time corresponding to 1T is determined by a standard for the interval between the lines having low reflectance in a certain number of rotations of a certain radius, and the interval width is regarded as the data.

In the Blu-ray, the BCA has a disk radius of 21.0 mm to 22.0 mm. The number of channel bits cbs is 4648 cbs including all the barcode-like data. Further, there is a blank period between the head and the end of the BCA data, and this blank period is about 102±50 cbs.

Figure 13:
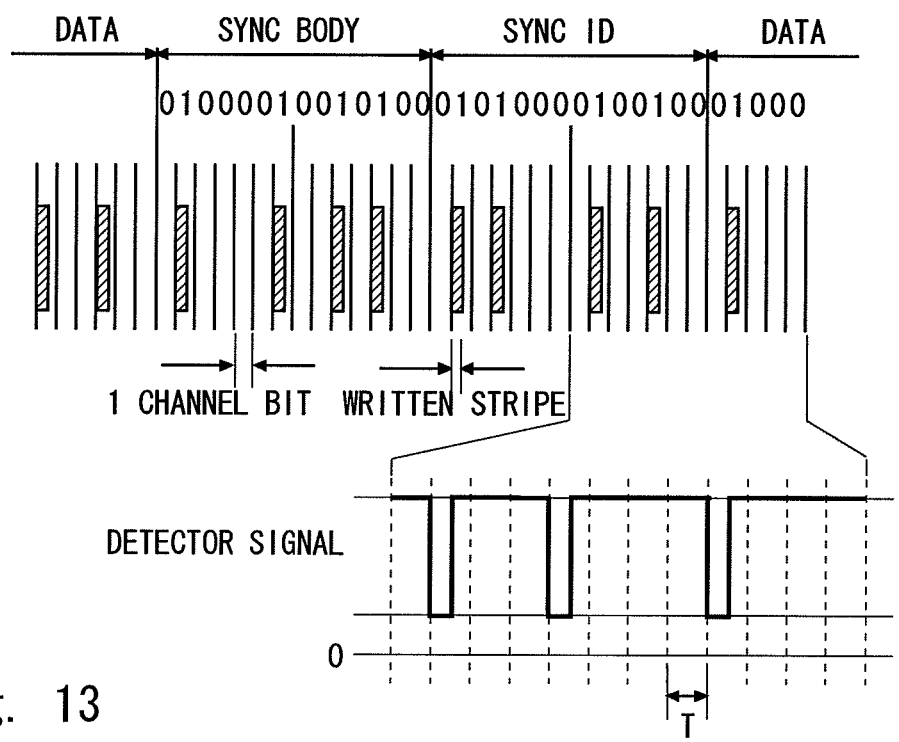
FIG. 13 shows a BCA signal detection example of a Blu-ray.

As shown in FIG. 13, the 1T interval having high reflectance has the channel data of 0, and the 1T interval having low reflectance has the channel data of 1. The rpm is 2174 rpm when the linear speed is 4.917 m/s at the point of radius of 21.6 mm and the time between 1T is 5.8 µs. The unit of rpm here indicates the number of rotations per one minute.

SB shown in FIG. 14 means Sync Byte, which indicates synchronization pattern. The synchronization pattern includes ten patterns of $SB_{0,0}$, $SB_{0,1}$, $SB_{0,2}$, $SB_{0,3}$, $SB_{1,0}$, $SB_{1,1}$, $SB_{1,2}$, $SB_{1,3}$, $SB_{3,2}$, and $SB_{3,2}$. The synchronization pattern corresponds to 1 byte when demodulated. The BCA data is structured by a plurality of units of frame segmented by the synchronization pattern. In the Blu-ray, the BCA data is formed by 33 frames and $SB_{3,2}$ at the last part. As shown in FIG. 14, the Blu-ray BCA data can be divided into four data units. $I_{x,y}$ indicates the data part, and $C_{x,y}$ indicates the parity part.

The Blu-ray BCA is modulated by a 1-out-of-4 modulation method. FIG. 15 shows the 1-out-of-4 modulation conversion table.

FIG. 16 shows a synchronization pattern for each frame shown by $SB_{x,y}$. x and y shown in $SB_{x,y}$ indicate synchronization number. This number is modulated in accordance with the modulation method shown in FIG. 16 described above.

In the present exemplary embodiment, the head of the data area of the BCA area is detected by detecting the space area. In order to detect the space area, the threshold value Th2 for determining whether the signal is the data signal of the BCA data area and the threshold value Th3 for detecting that the data in the BCA data area is read out are employed in addition to the threshold value Th1 for determining the space area. Accordingly, even when there is a noise in the space area or when there is a blank in the data area due to the defect, the space area can be detected with accuracy. Accordingly, it is possible to detect the BCA data start position with accuracy.

Further, according to Noro, since the ECC synch is considered as the termination condition, the information data length can be falsely detected when the ECC synch cannot be detected. Also in this point, in this exemplary embodiment, the start condition is treated as the termination condition, which makes it possible to prevent the false recognition of the information data length.

Second Exemplary Embodiment

Figure 17:
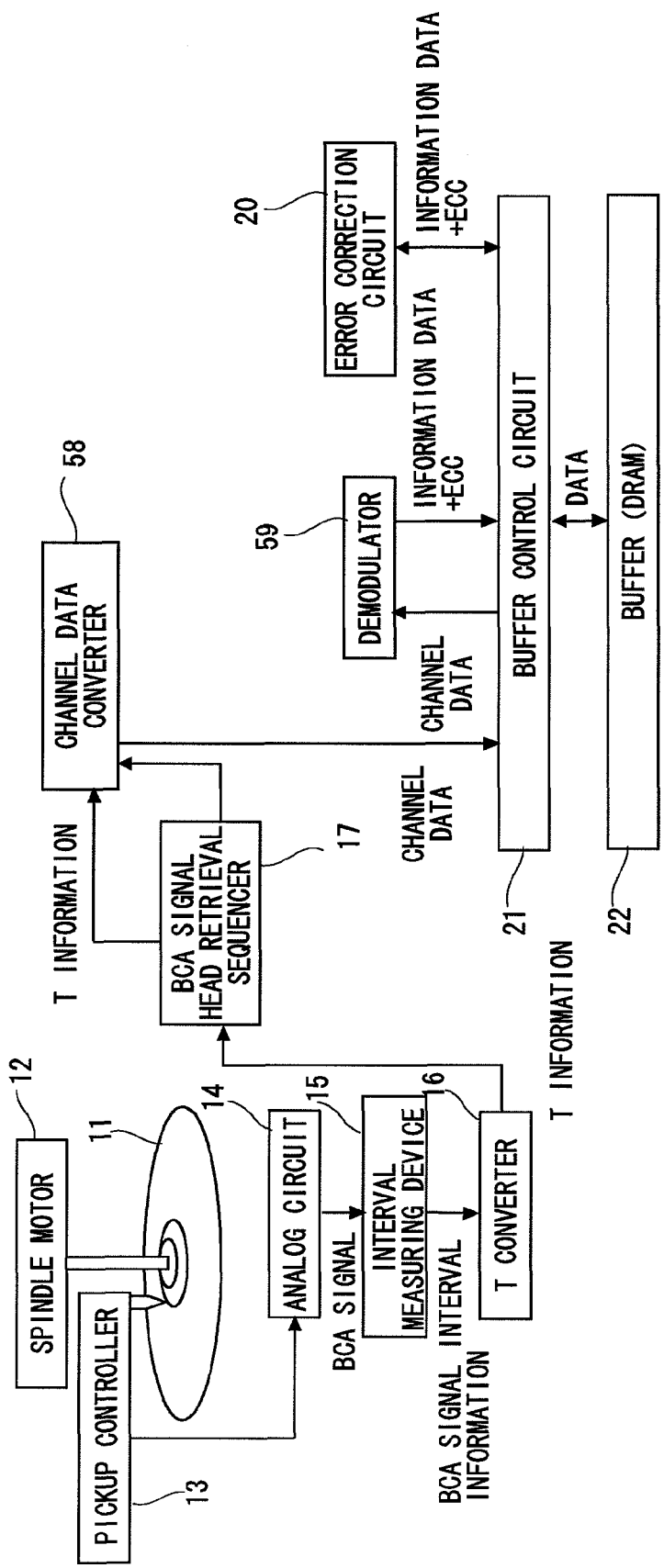
FIG. 17 is a diagram showing a reproduction apparatus according to a second exemplary embodiment of the present invention.

FIG. 17 is a diagram showing a reproduction apparatus according to the second exemplary embodiment of the present invention. In the first exemplary embodiment described above, the BCA signal head retrieval sequencer 17 transfers the T information after the detection of the end of the space area to the demodulator 19 by way of the channel data converter 18. On the other hand, in the present exemplary embodiment, the T information is converted into the channel data by the channel data conversion and then the channel data is directly buffered. Then the channel data which is buffered is received by the demodulator 19 for the demodulation.

Further, in the exemplary embodiment of the above description, there is a need to hold the data by the determination of the synchronization pattern as is the same as Noro, which means that there is a need to provide a storing circuit such as a register in the demodulator 19 itself. On the other hand, a demodulator 59 according to the present exemplary embodiment shown in FIG. 19 does not need the storing circuit.

In this exemplary embodiment, the channel data converter 58 transfers the data to the buffer 22 through the buffer control circuit 21 only when the output enable signal from the BCA signal head retrieval sequencer is equal to 1, which is different from the exemplary embodiment described above. The control circuit such as the micon activates the demodulator every time the data is stored in the buffer for a certain amount and demodulates the stored data. Since there is data already in the data buffer, there is no need to store the data by the synchronization pattern detection in the demodulator. The demodulator 59 performs the demodulation processing in the same way as that in the first exemplary embodiment in which the data is obtained from the BCA signal head retrieval sequencer 17. In this case, the processings such as the synchronization pattern detection and the demodulation executed by the demodulator 59 are the same as in the first exemplary embodiment.

Note that the present invention is not limited to the exemplary embodiments described above but can be changed as appropriate without departing from the spirit of the present invention. For example, although the exemplary embodiment described above has been described as a hardware structure, the present invention is not limited to it. It is also possible to realize any processing by forcing the CPU (Central Processing Unit) to execute the computer program. In this case, the computer program may be recorded in the storing media to be provided. Otherwise the computer program may be transmitted through the Internet or other transmission media to be provided.

Figure 18:
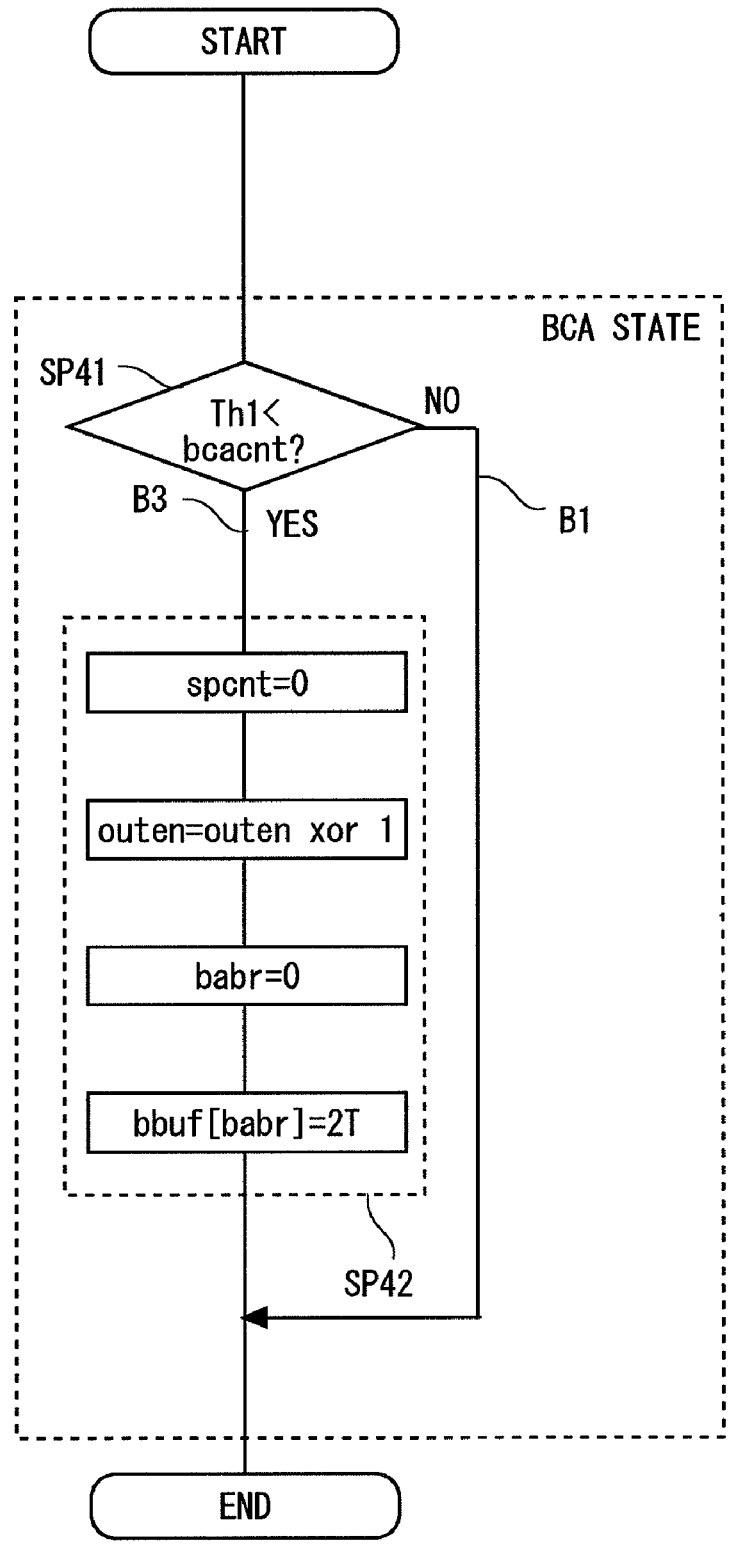
FIG. 18 is a flow chart showing a case in which the space area is determined only by Th1.
Figure 19:
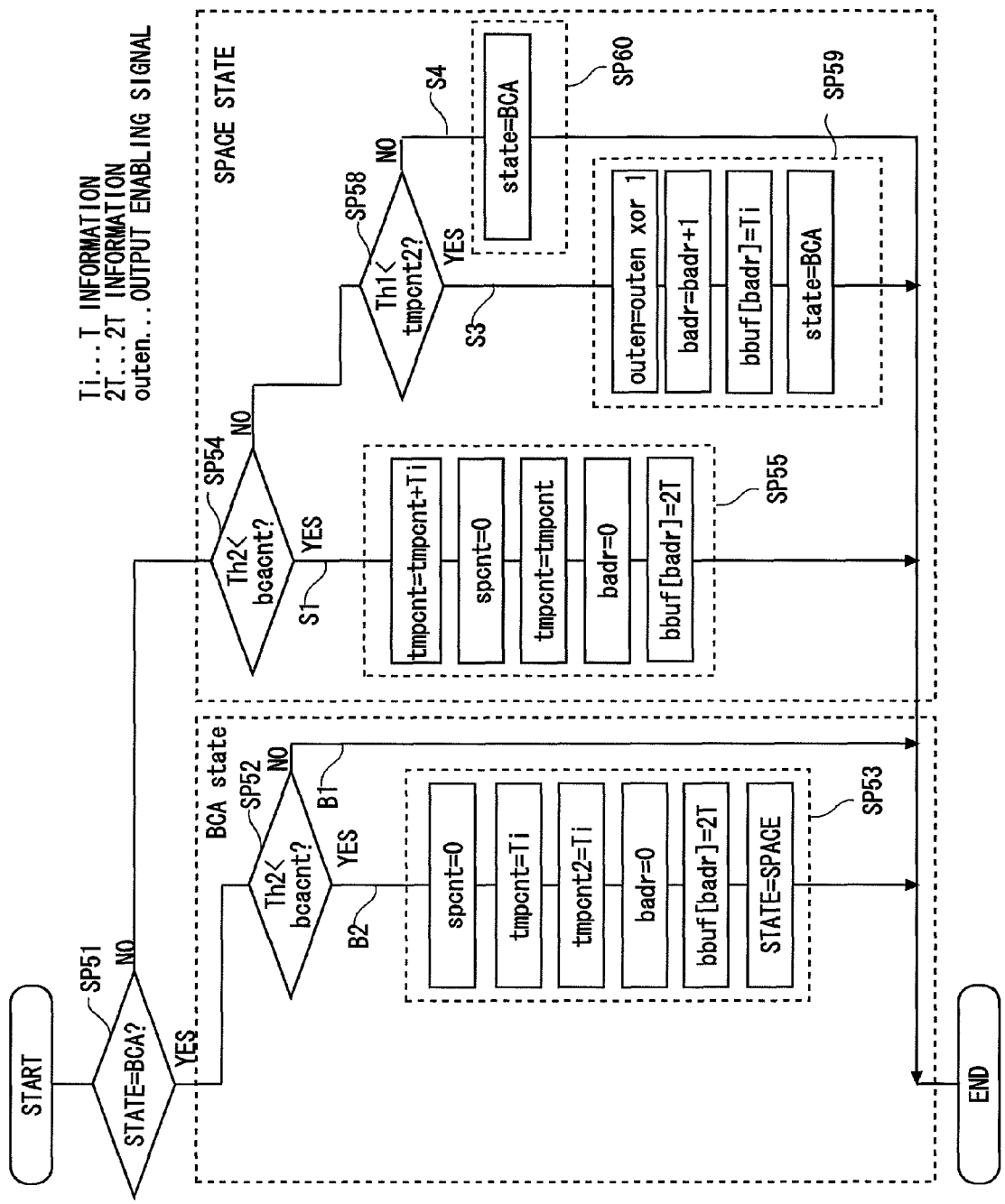
FIG. 19 is a flow chart showing a case in which the space area is determined only by Th1 and Th2.
Figure 20:
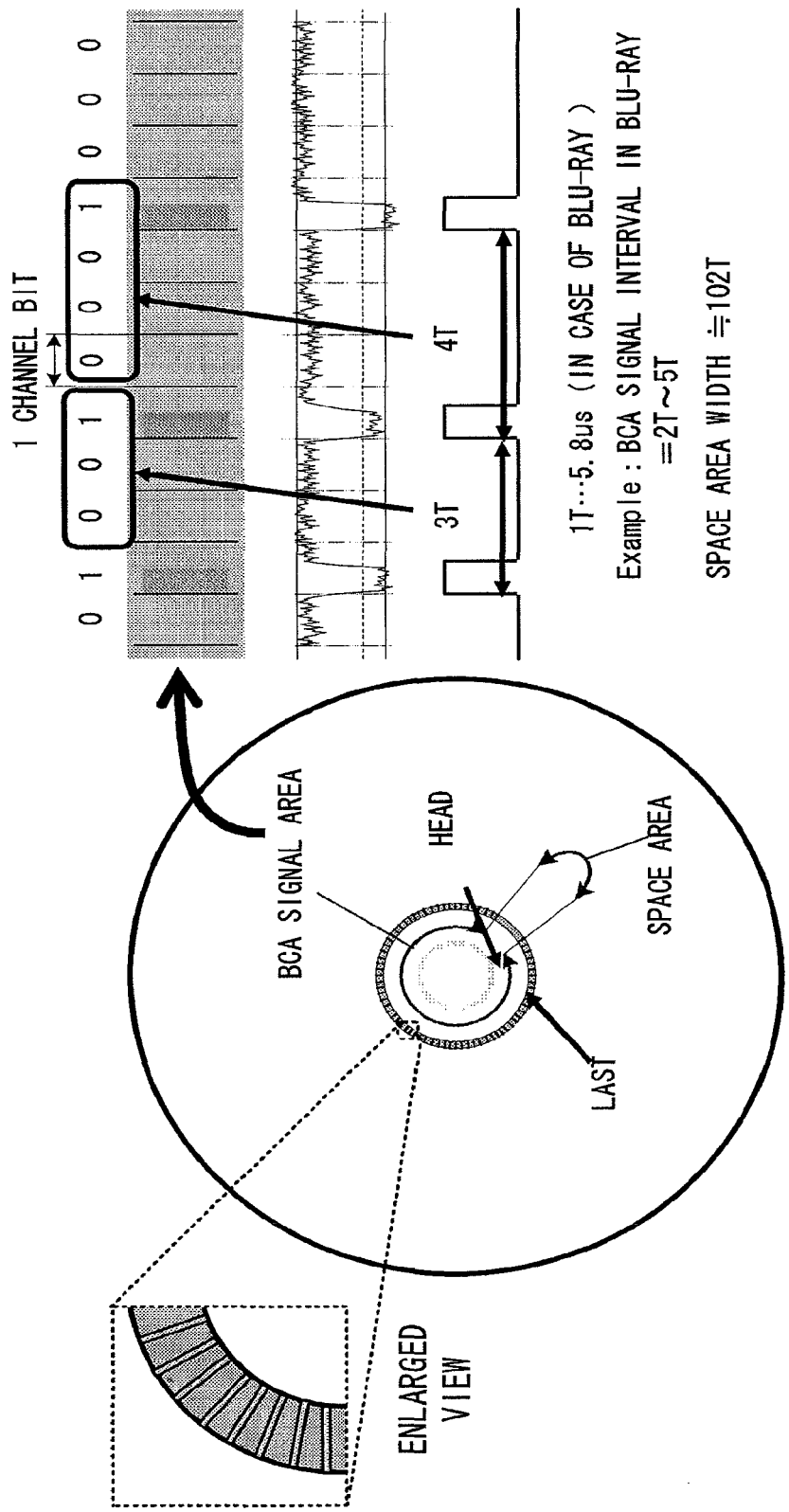
FIG. 20 is a schematic diagram showing a BCA signal area on a disk.
Figure 21:
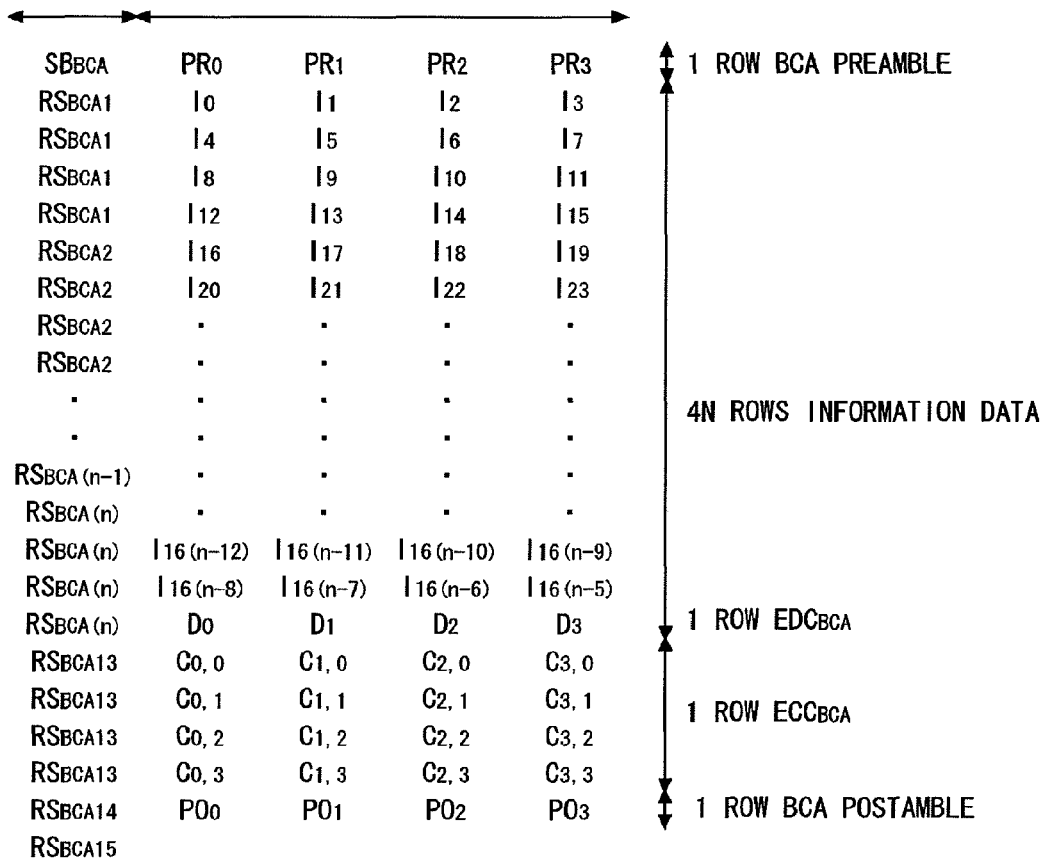
FIG. 21 is a diagram showing a format of data stored in the BCA.
Figure 22:
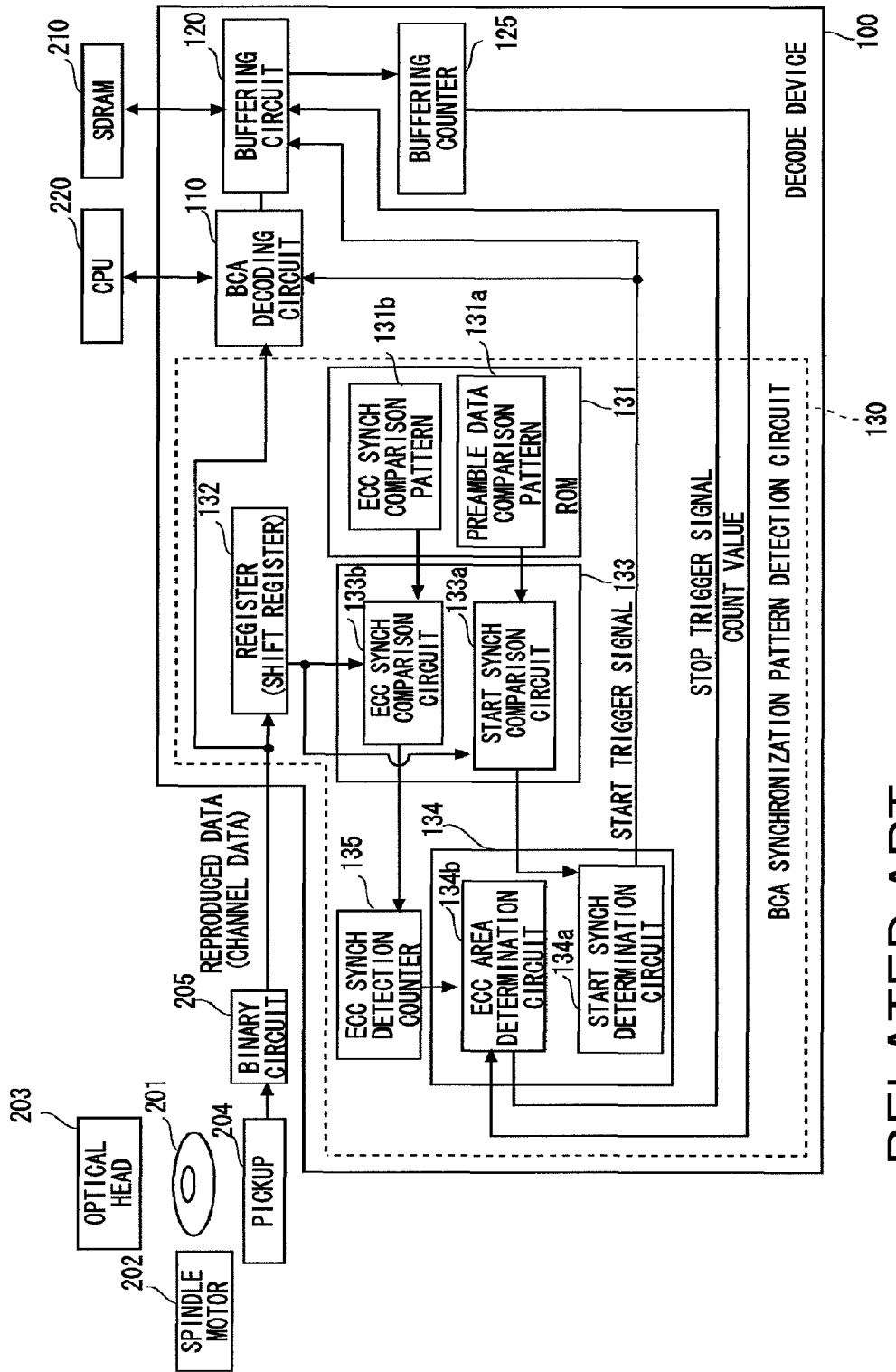
FIG. 22 is a diagram showing a DVD reproduction apparatus disclosed by Noro.
Figure 23:
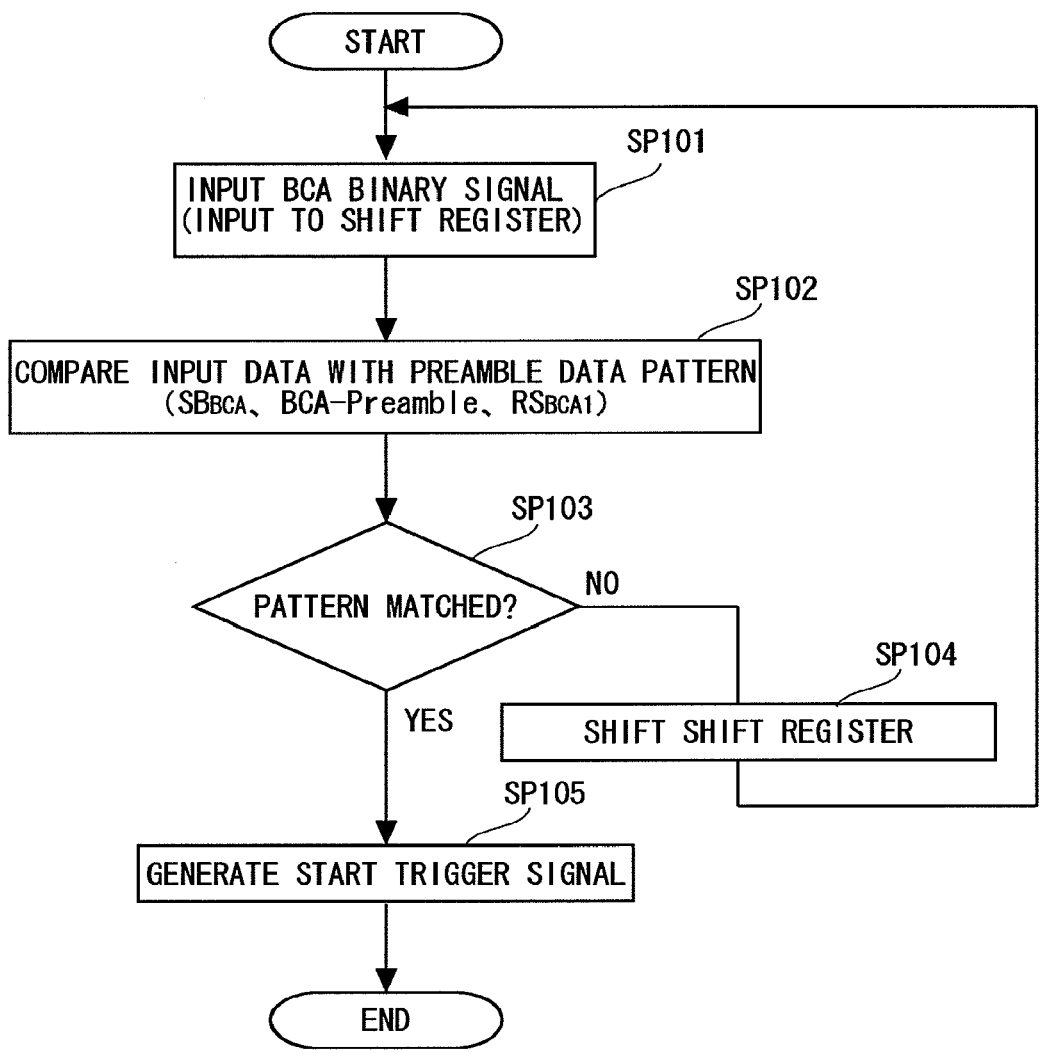
FIG. 23 is a flow chart showing a detection start procedure of a synchronization pattern disclosed by Noro.
Figure 24:
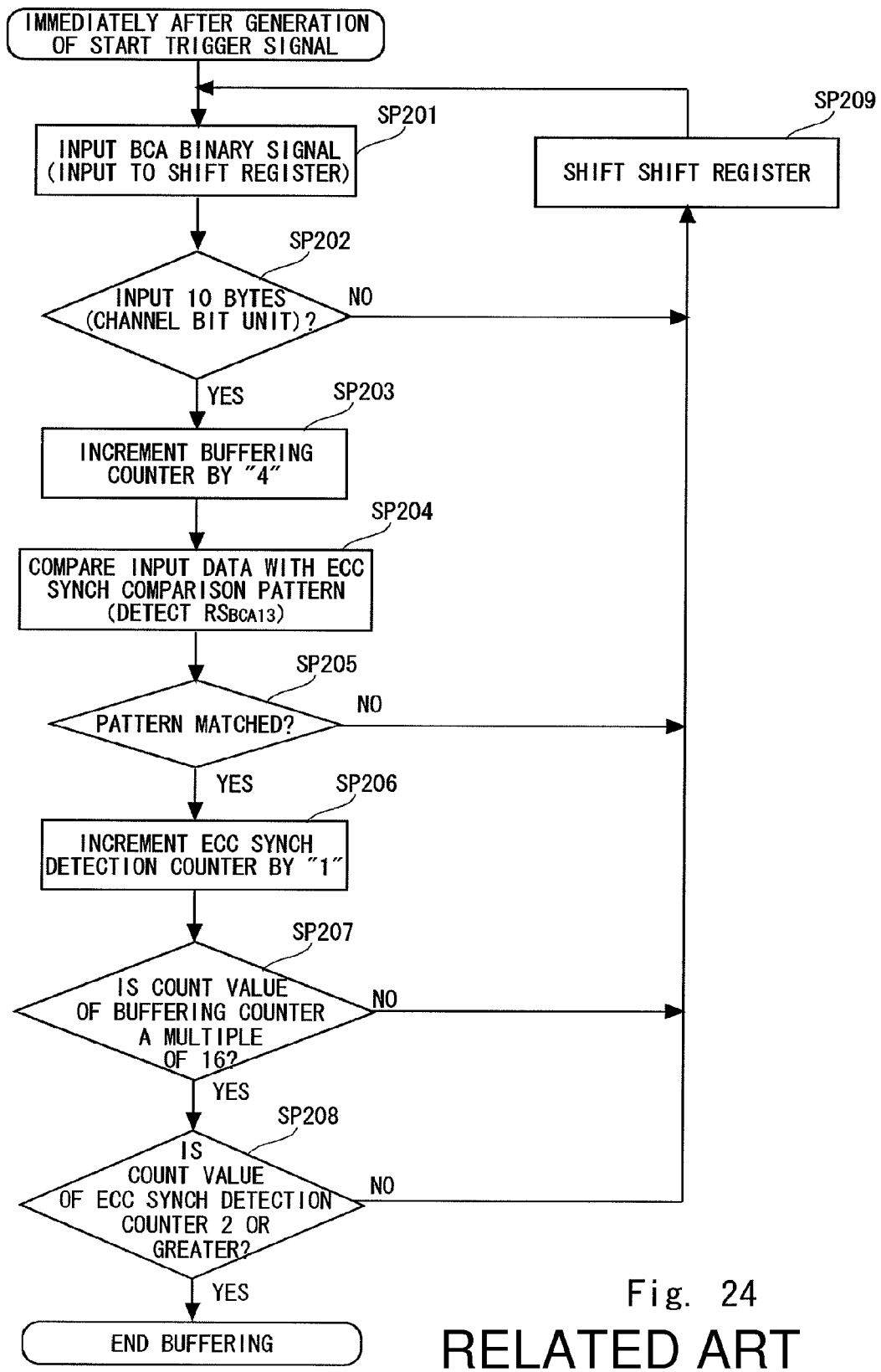
FIG. 24 is a flow chart showing completion of detecting the synchronization pattern disclosed by Noro.

Further, although the present exemplary embodiment determines the space area by three threshold values as stated above, the space area can be determined by using one or two threshold values. FIG. 18 is a flow chart showing a case in which the space area is determined only by Th1, and FIG. 19 is a flow chart showing a case in which the space area is determined only by the Th1 and Th2. When the determination is made only by the threshold value Th1, the interval of the BCA signal is determined by Th1 as shown in FIG. 18. Then when the signal larger than Th1 appears, it is determined as the space area. Even when there is existing the small noise in the data area, the space area can be detected.

When the space area is determined by two threshold values, the T information which is input is first compared with Th2 as shown in FIG. 19. If the T information is equal to or smaller than Th2, the process passes through B1. When the T information is larger than Th2, the process goes to SP53, and the state transits from the $BCA_{state}$ to the $SPACE_{state}$. The operation stated above is the same as that of the first exemplary embodiment. It is determined whether the T information is equal to or lower than Th2 in the $SPACE_{state}$. When the T information is equal to or lower than Th2, then the process goes to SP55. On the other hand, when the T information equal to Th2 or more is input, the process goes to SP58. When the T information is larger than Th1, the process goes to SP59. In this case, it is determined as the space area and the state goes back to the $BCA_{state}$. When the T information is smaller than Th1, the step goes to step S60. In this case, it is determined as the noise and the state goes back to the $BCA_{state}$. From the above description, it is possible to determine the space area by a simple method only with the threshold value Th1 or the threshold values Th1 and Th2. Further, the first and second exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A decoding apparatus comprising:
    a burst cutting area (BCA) signal interval measuring device which measures a signal interval of a BCA area and which outputs BCA signal interval information;
    a T converter which obtains T information from the BCA signal interval information, wherein T is a channel bit interval;
    a sequencer which detects a space area based on a first threshold value and which outputs an output enable signal based on the T information and a detecting result, wherein the output enable signal shows that a signal is obtained from a data area of the BCA area, and the space area is a non-signal area of the BCA area; and
    a channel data converter which converts the T information into channel data based on the output enable signal from the sequencer.

2. The decoding apparatus according to claim 1, wherein:
    the sequencer cumulatively adds the T information of a specified area based on a second threshold value and detects the space area by comparing the cumulatively added T information with the first threshold value, and
    the sequencer uses the second threshold value to determine whether the BCA signal interval is within a predetermined range and whether the specified area is likely to be the space area.

3. The decoding apparatus according to claim 1, wherein:
    the sequencer compares a second threshold value with the T information, cumulatively adds the T information while a signal interval outside of a predetermined range is detected until the T information from the data area is input, and detects the space area by comparing the cumulatively added T information with the first threshold value, and
    the sequencer determines that the T information is input from the data area if the T information is within the predetermined range.

4. The decoding apparatus according to claim 1, wherein:
    the sequencer compares a second threshold value with the T information, cumulatively adds the T information while a signal interval outside of a predetermined range is detected until the T information from the data area is input, and detects the space area by comparing the cumulatively added T information with the first threshold value, and
    if T information within the predetermined range is detected after detecting a signal interval outside of the predetermined range, the sequencer cumulatively adds the T information and determines that the T information is input from the data area by comparing the cumulatively added T information with a third threshold value, and the sequencer uses the third threshold value to determine that the T information was obtained from the data area.

5. The decoding apparatus according to claim 1, further comprising:
   a demodulator which demodulates the channel data from the channel data converter; and
   a buffer which buffers the channel data demodulated by the demodulator.

6. The decoding apparatus according to claim 1, further comprising:
   a buffer which buffers the channel data from the channel data converter; and
   a demodulator which reads out and demodulates the channel data buffered by the buffer.

7. The decoding apparatus according to claim 5, wherein:
   the demodulator outputs the output enable signal if the demodulator detects more than N fixed patterns,
   there are K fixed patterns of the data area of the BCA area,
   N and K are natural numbers, and
   N is not greater than K.

8. The decoding apparatus according to claim 1, wherein the BCA signal interval measuring device measures a rising interval of a signal if the signal is 1 and a non-signal is 0, and measures a falling interval of the signal if the signal is 0 and the non-signal is 1.

9. A decoding apparatus for decoding a data signal recorded on a data area of a media having the data area and a non-signal area, the decoding apparatus comprising:
   a signal interval measuring device which measures a signal interval of the media and which outputs signal interval information;
   a sequencer which compares a second threshold value with the signal interval information, cumulatively adds the signal interval information while a signal interval outside of a predetermined range is detected until the signal interval information from the data area is input, and detects the non-signal area by comparing the cumulatively added signal interval information with a first threshold value, wherein the sequencer inputs the signal interval information from the data area if the sequencer detects signal interval information within the predetermined range, and outputs an output enable signal showing that the sequencer obtained a signal from the data area; and
   a channel data converter which converts the signal interval information into channel data based on the output enable signal from the sequencer.

10. The decoding apparatus according to claim 9, wherein if a signal interval information within the predetermined range is detected after a signal interval information outside of the predetermined range is detected, the sequencer determines that T information is input from the data area by comparing the cumulatively added signal interval information with a third threshold value, and the sequencer uses the third threshold value to decide to obtain signal interval information from the data area, wherein T is a channel bit interval.

11. A reproducing apparatus comprising:
   a reading unit which reads data from a disc;
   a decoder which decodes data read by the recording unit; and
   a reproducer which reproduces data based on a decoding result,
   wherein the decoder comprises:
   a burst cutting area (BCA) signal interval measuring device which measures a signal interval of a BCA area and which outputs BCA signal interval information;
   a T converter which obtains T information from the BCA signal interval information, wherein T is a channel bit interval;
   a sequencer which detects a space area based on a first threshold value and which outputs an output enable signal based on the T information and a detecting result, wherein the output enable signal shows that a signal is obtained from a data area of the BCA area, and the space area is a non-signal area of the BCA area; and
   a channel data converter which converts the T information into a channel data based on the output enable signal from the sequencer.

12. A decoding method comprising:
   measuring a signal interval of a burst cutting area (BCA) area and outputting BCA signal interval information;
   obtaining T information from the BCA signal interval information, wherein T is a channel bit interval;
   outputting an output enable signal based on the T information if a sequencer detects a space area based on a first threshold value, wherein the space area is a non-signal area of the BCA area; and
   converting the T information into channel data based on the output enable signal.

13. The decoding method according to claim 12, wherein:
   the sequencer detects the space area based on a second threshold value, cumulatively adds the T information of a specified area, and compares the cumulatively added T information with the first threshold value, and
   the second threshold value is used to determine whether the BCA signal interval is within a predetermined range and whether the specified area is likely to be the space area.

14. The decoding method according to claim 12, wherein the sequencer detects the space area by comparing a second threshold value with the T information, cumulatively adds the T information while detecting a signal interval outside of a predetermined range until T information from the data area is input, and compares the cumulatively added T information with the first threshold value, and if T information within a predetermined range is detected, the sequencer determines that T information from the data area was input.

15. The decoding method according to claim 12, wherein the sequencer detects the space area by comparing a second threshold value with the T information, cumulatively adds the T information while detecting a signal interval outside out of a predetermined range until T information from the data area is input, and compares the cumulatively added T information with the first threshold value, and if T information within a predetermined range is detected after detecting a signal interval outside of the predetermined range, the sequencer determines that T information from the data area was input by cumulatively adding the T information and comparing the cumulatively added T information with a third threshold value, wherein the third threshold value is used to decide to obtain T information from the data area.

16. The decoding method according to claim 12, further comprising:
   demodulating the channel data; and
   buffering the demodulated channel data to a buffer.

17. The decoding method according to claim 12, further comprising:
 buffering the channel data; and
 reading out and demodulating the buffered channel data.

18. The decoding method according to claim 16, wherein the demodulating the channel data comprises instructing a beginning of decoding if N fixed patterns are detected, wherein:
 there are K fixed patterns of the data area of the BCA area,
 N and K are natural numbers, and
 N is not greater than K.

19. The decoding method according to claim 12, wherein during measuring the signal interval of the BCA area, a rising interval of a signal is measured if the signal is 1 and a non-signal is 0, and a falling interval of the signal is measured if the signal is 0 and the non-signal is 1.

* * * * *